United States Patent
Kalra et al.

(10) Patent No.: US 7,904,386 B2
(45) Date of Patent: Mar. 8, 2011

(54) SYSTEM, METHOD, AND COMPUTER PROGRAM PRODUCT FOR SAVING AND INVESTING THROUGH USE OF TRANSACTION CARDS

(75) Inventors: Simran K. Kalra, New York, NY (US); Greg Keeley, New York, NY (US); Jeannette J. Yee, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 222 days.

(21) Appl. No.: 11/493,662

(22) Filed: Jul. 27, 2006

(65) Prior Publication Data

US 2007/0185810 A1    Aug. 9, 2007

Related U.S. Application Data

(60) Provisional application No. 60/722,034, filed on Sep. 30, 2005.

(51) Int. Cl.
*G06Q 40/00* (2006.01)

(52) U.S. Cl. .......................................... 705/40

(58) Field of Classification Search ................ 705/1–45; 235/379; 380/14.1; 709/203; 713/155; 725/5
See application file for complete search history.

(56) References Cited

U.S. PATENT DOCUMENTS

| | | | |
|---|---|---|---|
| 4,346,442 A * | 8/1982 | Musmanno | 705/36 R |
| 4,597,046 A * | 6/1986 | Musmanno et al. | 705/36 R |
| 4,694,397 A * | 9/1987 | Grant et al. | 705/42 |
| 4,751,640 A * | 6/1988 | Lucas et al. | 705/36 R |
| 4,823,265 A * | 4/1989 | Nelson | 705/35 |
| 4,933,842 A * | 6/1990 | Durbin et al. | 705/36 R |
| 4,941,090 A | 7/1990 | McCarthy | |
| 5,117,355 A | 5/1992 | McCarthy | |
| 5,200,889 A | 4/1993 | Mori | |
| 5,202,826 A | 4/1993 | McCarthy | |
| 5,262,942 A | 11/1993 | Earle | |
| 5,297,026 A * | 3/1994 | Hoffman | 705/14.18 |

(Continued)

FOREIGN PATENT DOCUMENTS

WO    WO 01/27827 A1    4/2001

OTHER PUBLICATIONS

ATA Airlines Upgrades Its Travel Awards Frequent Flyer Program Customers Can Track Points and Redeem Free Travel Online, PR Newswire, p. NA, Nov. 10, 2003.*

(Continued)

*Primary Examiner* — Mary Cheung
*Assistant Examiner* — Tien C Nguyen
(74) *Attorney, Agent, or Firm* — Snell & Wilmer L.L.P.

(57) ABSTRACT

A system, method, and computer program product are used for saving through use of transaction cards. This is done through associating a transaction account of the transaction card with one or more deposit accounts. An amount of funds to be deposited from the transaction account into the deposit account is established. A number of times a deposit will be made is established. A time duration between the deposits when more than one deposit will be made is established. An event that initiates at least a first one of the deposits is established. The amount of funds from the transaction card account is deposited into the deposit account based on the above criteria.

15 Claims, 16 Drawing Sheets

U.S. PATENT DOCUMENTS

| | | | |
|---|---|---|---|
| 5,483,445 A | 1/1996 | Pickering | |
| 5,717,989 A | 2/1998 | Tozzoli et al. | |
| 5,745,706 A * | 4/1998 | Wolfberg et al. | 705/35 |
| 5,761,650 A | 6/1998 | Munsil et al. | |
| 5,787,404 A | 7/1998 | Fernandez-Holmann | |
| 5,970,480 A | 10/1999 | Kalina | |
| 5,991,736 A * | 11/1999 | Ferguson et al. | 705/14.18 |
| 6,061,660 A * | 5/2000 | Eggleston et al. | 705/14.12 |
| 6,070,153 A * | 5/2000 | Simpson | 705/36 R |
| 6,105,865 A | 8/2000 | Hardesty | |
| 6,112,191 A * | 8/2000 | Burke | 705/41 |
| 6,164,533 A | 12/2000 | Barton | |
| 6,243,688 B1 | 6/2001 | Kalina | |
| 6,345,261 B1 | 2/2002 | Feidelson et al. | |
| 6,386,444 B1 | 5/2002 | Sullivan | |
| 6,434,534 B1 * | 8/2002 | Walker et al. | 705/14.13 |
| 6,581,041 B1 | 6/2003 | Canney | |
| 6,592,030 B1 | 7/2003 | Hardesty | |
| 6,631,358 B1 | 10/2003 | Ogilvie | |
| 6,663,002 B2 | 12/2003 | Glaser | |
| 6,745,938 B2 | 6/2004 | Sullivan | |
| 6,820,061 B2 | 11/2004 | Postrel | |
| 6,829,586 B2 | 12/2004 | Postrel | |
| 7,086,586 B1 * | 8/2006 | Sullivan | 235/379 |
| 7,389,256 B1 * | 6/2008 | Adams et al. | 705/35 |
| 2003/0078864 A1 * | 4/2003 | Hardesty et al. | 705/35 |
| 2003/0105689 A1 * | 6/2003 | Chandak et al. | 705/35 |
| 2003/0149629 A1 * | 8/2003 | Claridge et al. | 705/17 |
| 2004/0243498 A1 * | 12/2004 | Duke | 705/35 |
| 2005/0075978 A1 * | 4/2005 | Leavitt et al. | 705/40 |
| 2005/0108132 A1 * | 5/2005 | Doynow | 705/35 |
| 2005/0125292 A1 * | 6/2005 | Kassab et al. | 705/14 |
| 2005/0222951 A1 * | 10/2005 | Sherman | 705/40 |
| 2006/0253321 A1 * | 11/2006 | Heywood | 705/14 |

OTHER PUBLICATIONS

Citi Introduces Home Rebate Platinum Select(R) Mastercard(R), PR Newswire, Tuesday, Apr. 13, 2004.*

* cited by examiner

PERSONAL CARD STATEMENT OF ACCOUNT

CLOSING DATE: DECEMBER 20, 1996 — 705
ACCOUNT NUMBER: 3720
PAGE 1 OF 4

| PREVIOUS CARD BALANCE $ | PAYMENTS/CREDITS $ | NEW CARD CHARGES $ | NEW CARD BALANCE $ | S&T AND/OR SPA MINIMUM PAYMENT $ | MINIMUM AMOUNT DUE $ |
|---|---|---|---|---|---|
| 233.09 | -233.09 | 157.50 | 157.50 | 20.00 | 177.50 |

STATEMENT INCLUDES PAYMENTS AND CHARGES RECEIVED BY DECEMBER 20, 1996.
*INDICATES POSTING DATE.

JOIN US IN THE CHARGE AGAINST HUNGER IN NOV. & DEC. HELP PROVIDE A MEAL FOR SOMEONE WHO IS HUNGRY. FOR MORE INFO. PLEASE REFER TO CARDMEMBER VALUES OR CALL (888)-8-TO-GIVE.

PLEASE REFER TO PAGE 4 FOR IMPORTANT INFORMATION REGARDING YOUR CARD ACCOUNT

TERMS-PAYABLE IN FULL UPON RECEIPT OF STATEMENT.
FOR FAST BALANCE AND PAYMENT INFORMATION, CALL OUR AUTOMATED SERVICE LINE AT 1-800-292-2639 USING A TOUCH TONE PHONE. PLEASE HAVE YOUR ACCOUNT NUMBER READY. IF YOU HAVE A QUESTION ABOUT YOUR ACCOUNT, CALL 1-800-528-4800 (24 HOURS/7 DAYS).

SUMMARY OF ACCOUNT:
SIGN & TRAVEL AND/OR
SPECIAL PURCHASE ACCOUNT      SEE THE ENCLOSED SIGN & TRAVEL AND/OR SPECIAL PURCHASE ACCOUNT
                              STATEMENT OF ACCOUNT FOR COMPLETE TRANSACTION DETAIL.
TOTAL BALANCE      $455.99
MINIMUM PAYMENT    $20.00

| CARD DETAIL | AMOUNT $ |
|---|---|
| CARD PAYMENTS | |
| DECEMBER 7, 1996* | -150.79 |
| 215.44 PYMT RECVD-THANK YOU | |
| 64.65 APPLIED TO SIGN & TRAVEL/SPA | |
| TOTAL OF CARD PAYMENTS | -150.79 |
| CARD TRANSACTIONS FOR | |
| CARD 3720-672026-82000 | |
| NOVEMBER 14, 1996 | 22.15 |
| LA PENICHE INC NEW ORLEANS LA | |
| FOOD/BEVERAGE | |
| REFERENCE 000000105840 ROC NUMBER 0000105840 | |
| NOVEMBER 26, 1996 | 20.70 |
| LOUISIANA SUPERDOME NEW ORLEANS LA | |
| CHAIN ADDITION | |
| REFERENCE 00014031 | |

↧ PLEASE FOLD ON THE PERFORATION BELOW, DETACH AND RETURN WITH YOUR PAYMENT ↧     CONTINUED ON REVERSE

PAYMENT COUPON     ACCOUNT NUMBER 3720

PLEASE PAY BY: JANUARY 14, 1997
MINIMUM AMOUNT DUE $177.50

PLEASE ENTER ACCOUNT NUMBER ON ALL CHECKS AND CORRESPONDENCE. PAYABLE IN U.S. DOLLARS UPON RECEIPT WITH A CHECK DRAWN ON A BANK IN THE U.S. OR MONEY ORDER, PROCESSABLE THROUGH THE U.S. BANKING SYSTEM.

CHECK HERE IF ADDRESS OR TELEPHONE NUMBER HAS CHANGED. NOTE CHANGES ON REVERSE SIDE. ☐

70153-3062

MAIL PAYMENT TO:    AMERICAN EXPRESS TRS
                    SUITE 0001
                    CHICAGO IL 60679-0001

| CARD DETAIL CONTINUED | AMOUNT $ | PAGE 2 OF 4 |
|---|---|---|
| NOVEMBER 30, 1996<br>TRAVEL & LEISURE 800-888-8728 NY, NY<br>DU 1961029 SUBSCRIPTION REFUND | -33.00 | |
| DECEMBER 1, 1996<br>VERA CRUZ NEW ORLEANS LA<br>FOOD/BEVERAGE<br>FOOD/BEV 17.74<br>TIP 12.26<br>REFERENCE 00010174 | 30.00 | 705 |
| DECEMBER 2, 1996<br>CREDIT PENDING INVESTIGATION OF DISPUTE | -24.65 | |
| DECEMBER 2, 1996<br>GEVALIA KAFFE 800-438-2542 IA<br>112996 57 COFEE SHIPMENT | -24.65 | |
| DECEMBER 3, 1996<br>REBILLING OF OUR PREV. ISSUED CREDIT | 24.65 | |
| DECEMBER 11, 1996*<br>PRIVELEGED ASSETS MINNEAPOLIS MN<br>DEC CONTRIBUTION<br>PRIVELEGED ASSETS<br>CERTIFICATE # 9555854655<br>FOR INQUIRIES CALL 1-800-633-4003<br>REFERENCE 955854655 ROC NUMBER 9555854655 | 60.00 | ← 710 |
| TOTAL FOR<br>NEW CHARGES 157.50 NEW CREDIT -82.30 | 75.20 | |
| TOTAL OF CARD ACTIVITY | NEW CARD CHARGES 157.50<br>NEW CARD PAYMENTS/CREDITS -233.09 | |

CHANGE OF ADDRESS
IF CORRECT ON FRONT
DO NOT USE

CONTINUED ON NEXT PAGE

NAME
COMPANY NAME
STREET ADDRESS
CITY-STATE
ZIP CODE
AREA CODE AND HOME PHONE NUMBER
AREA CODE AND WORK PHONE NUMBER

FIG.7B

Date                                      Amount          910

Deposit Institution Name/Routing Number

Deposit Account Number

Reference Number

FIG. 9

SYSTEM, METHOD, AND COMPUTER PROGRAM PRODUCT FOR SAVING AND INVESTING THROUGH USE OF TRANSACTION CARDS

CROSS REFERENCE TO RELATED APPLICATIONS

This application claims benefit under 35 U.S.C. §119(e) to U.S. Provisional Patent Application No. 60/722,034, filed Sep. 30, 2005, which is incorporated by reference herein in its entirety.

This application is related to co-pending and commonly-owned U.S. patent application Ser. No. 09/415,632, filed Oct. 12, 1999, which is incorporated by reference herein in its entirety.

BACKGROUND

1. Field of the Invention

The present invention relates generally to a system and method for applying funds to savings products and/or investment products, and more particularly, to a system and method for using a transaction card billing system to allow cardholders to make predetermined savings on a regular basis and/or investment contributions to multiple investment products on a regular basis.

2. Related Art

An increasing number of people are saving their money in a deposit account (e.g., a savings account, checking account, money market account, etc.) and/or investing their money in a variety of investment products. For many of these people, a prudent savings and/or investment strategy is to fund their deposit account and/or investment products, such as annuities, mutual funds, brokerage accounts, CDs, insurance, certificates, equities and the like, on a regular basis. However, even if people send a check to fund a deposit account and/or an investment product, the remittance process is typically time consuming and people often lack the discipline required to fund their deposit accounts and/or investment accounts on a regular basis. Moreover, people already typically write numerous checks each month to pay for transaction cards, utilities, investment products and other recurring expenses.

Due to the inefficiencies associated with numerous required remittances, people desire to avoid the hassles of multiple payments each month to various entities. Accordingly, a system which combines payments owed to selected entities and which relieves the consumer of the burden of having to proactively deposit separate savings and/or investment funds each month is needed.

Thus, a system which conveniently combines transaction card payments with savings and/or investment product payments would help to solve some of the existing remittance problems and satisfy unmet consumer needs. The combined system would also provide substantial benefits to savings institutions (e.g., banks, credit unions, etc.) and/or the investment product brokers by increasing the percentage of cardholders who save money with the institution and/or purchase investment products. Furthermore, the combination of transaction card payments and investment product payments would benefit broker by allowing the broker to analyze the cardholder investment decision-making process and suggest other investment options to the cardholder.

With respect to transaction cards, an increasing number of people use transaction cards each month, such as credit cards, charge cards, debit cards and the like, wherein the cards are primarily designed as a method of payment, a bill paying mechanism, or a means of financing the purchases of goods and services. Therefore, with respect to implementation of a combined system, most transaction card companies have already developed efficient billing and remittance systems, so supplementing the existing billing systems with deposit account and/or investment product billing and allocation functionality would most likely be a relatively modest software and hardware investment.

BRIEF DESCRIPTION

The present invention meets the above-identified needs by providing a system, method and computer program product for saving and investing through use of transaction cards.

An embodiment of the present invention provides a method for depositing funds into a deposit account through use of a transaction card. A transaction account of the transaction card is associated with the deposit account. An amount of funds to be deposited from the transaction account into the deposit account is established. A number of times a deposit will be made is established. A time duration between the deposits when more than one deposit will be made is established. An event that initiates at least a first one of the deposits is established. The amount of funds from the transaction card account is deposited into the deposit account based on the above criteria. These processes can be performed by an issuing transaction card company and a cardholder of the transaction card.

Alternatively, funds can be deposited into more than one deposit account, as designated by the card holder.

In a further aspect, the present invention provides a computer program product comprising a computer useable medium having a computer program logic recorded thereon for controlling at least one processor, wherein the computer program logic is comprised of computer program code devices that perform operations similar to the devices in the above embodiment.

Further features and advantages of the present invention as well as the structure and operation of various embodiments of the present invention are described in detail below with reference to the accompanying drawings.

BRIEF DESCRIPTION OF THE DRAWINGS/FIGURES

The subject invention will hereinafter be described in conjunction with the appended drawing figures, wherein like numerals denote like elements.

FIG. 7A shows an exemplary billing statement summary page in accordance with one embodiment of the present invention.

FIG. 7B shows an exemplary billing statement detail page in accordance with one embodiment of the present invention.

FIG. 9 shows a savings portion of a consolidated billing statement, according to one embodiment of the present invention

DETAILED DESCRIPTION

Overview and Terminology

Figure 1:
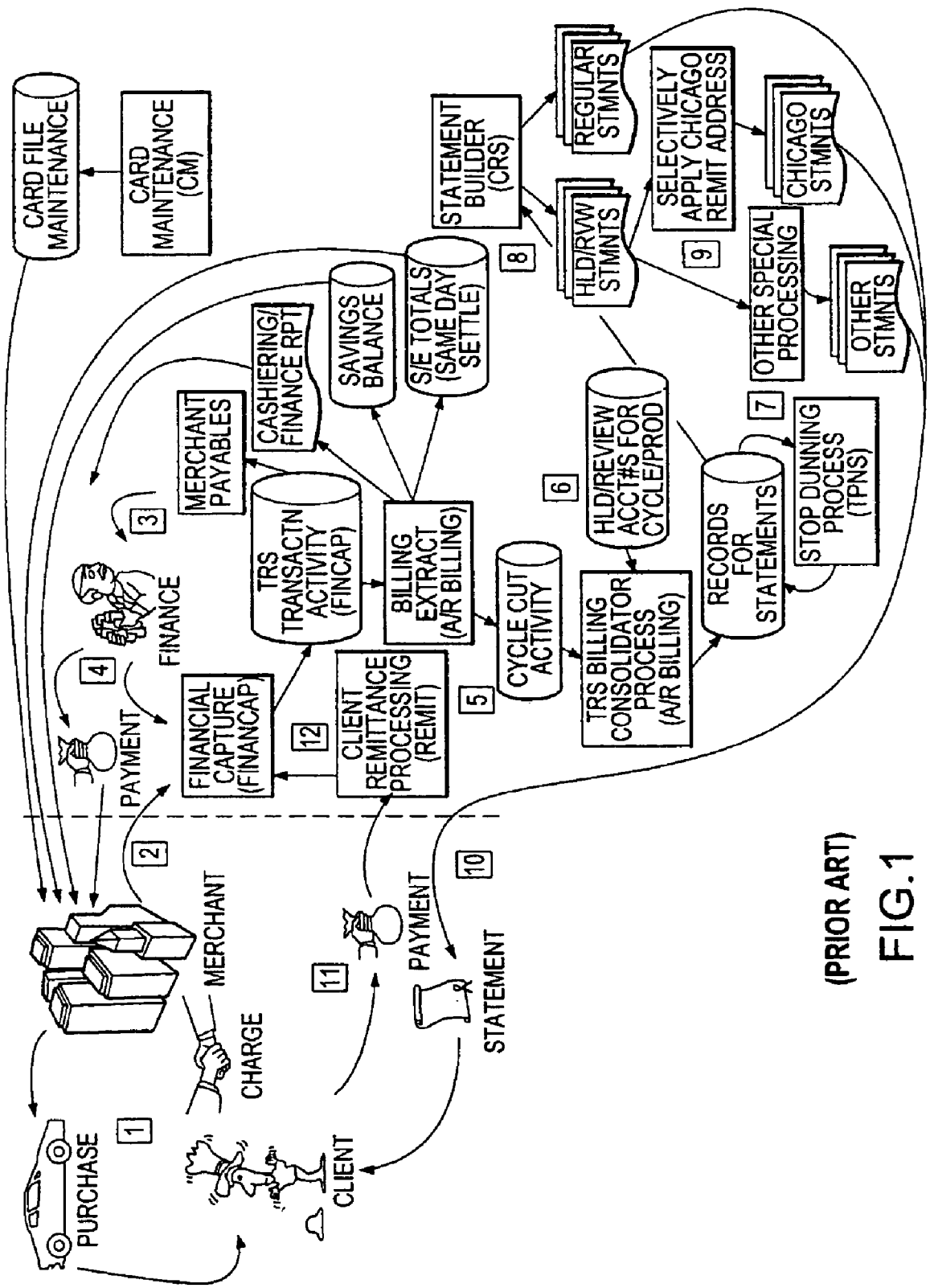
FIG. 1 is an exemplary block diagram showing a prior art card purchase/payment process including billing remittance and settlement.

The present invention is directed to a system, method and computer program product for depositing finds into a deposit and/or investment account from a transaction card account.

The present invention is now described in more detail herein in terms of the above exemplary description. This is for convenience only and is not intended to limit the application of the present invention. In fact, after reading the following description, it will be apparent to one skilled in the relevant art(s) how to implement the following invention in alternative embodiments.

The terms "purchaser," "user," "end user", "consumer", "customer," "participant," etc., and/or the plural form of these terms are used interchangeably throughout this description to refer to those persons or entities capable of accessing, using, being affected by and/or benefiting from the tool that the present invention provides for packaging and activating a stored value card.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Deposit Account

A "deposit account" as used herein refers to a highly liquid account associated with a deposit institution, such as a bank, credit union, or the like. Typical deposit accounts can include, but are not limited to, savings accounts, money market accounts, checking accounts, or other similar highly liquid accounts.

Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

Financial transaction instruments may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

Open Versus Closed Cards

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

Stored Value Cards

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments up to ten dollars.

Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

Exemplary Investment Embodiment(s)

As background, FIG. 1 shows an exemplary flow diagram of a typical prior art transaction card payment processing system including the billing, remittance and settlement processes. To start the billing process, a client purchases an item at a merchant by charging the item on a charge card (step 1). The merchant suitably reports the charge to the financial capture system of the charge card administrator (step 2), then the merchant payable system within the charge card system processes the pending payables and reports the payables to the charge card finance department so that the finance department knows the amount of funds to provide back to the merchant (step 3). The finance department then wires payment to the merchant and records the payment (financial event) in the financial capture system (step 4).

The charge card system also extracts the billing, remittance and adjustment information from the financial capture system, so that the accounts receivable billing system is able to group the new purchases with prior remittances and adjustments which occurred since the prior billing period (step 5). If appropriate, a hold and review code is assigned to a particular account number (step 6). The billing records are then scanned by the collection system, and if appropriate, adjustments are made to the billing records such as, for example, initiating a collection process for overdue amounts, canceling finance charges for overdue amounts, reversal of outstanding bills if the bills are over two months old, preparing a letter to the client explaining the reversal of the account, preparing a 60-day report letter to the client and/or the like (step 7). After completing the account analysis, the statement system populates the billing statements (step 8) and appropriately addresses the billing statements (step 9), then the billing statements are suitably transmitted to the clients (step 10).

After receiving the billing statement, the cardholder remits a check, electronic payment or other negotiable instrument to a payment center of the charge card administrator to cover the previously incurred charges (step 11). Upon receiving the remittance payment from the cardholder, the remittance processing system transmits a remittance receivables file to the financial capture system to settle the account (step 12).

Figure 2:
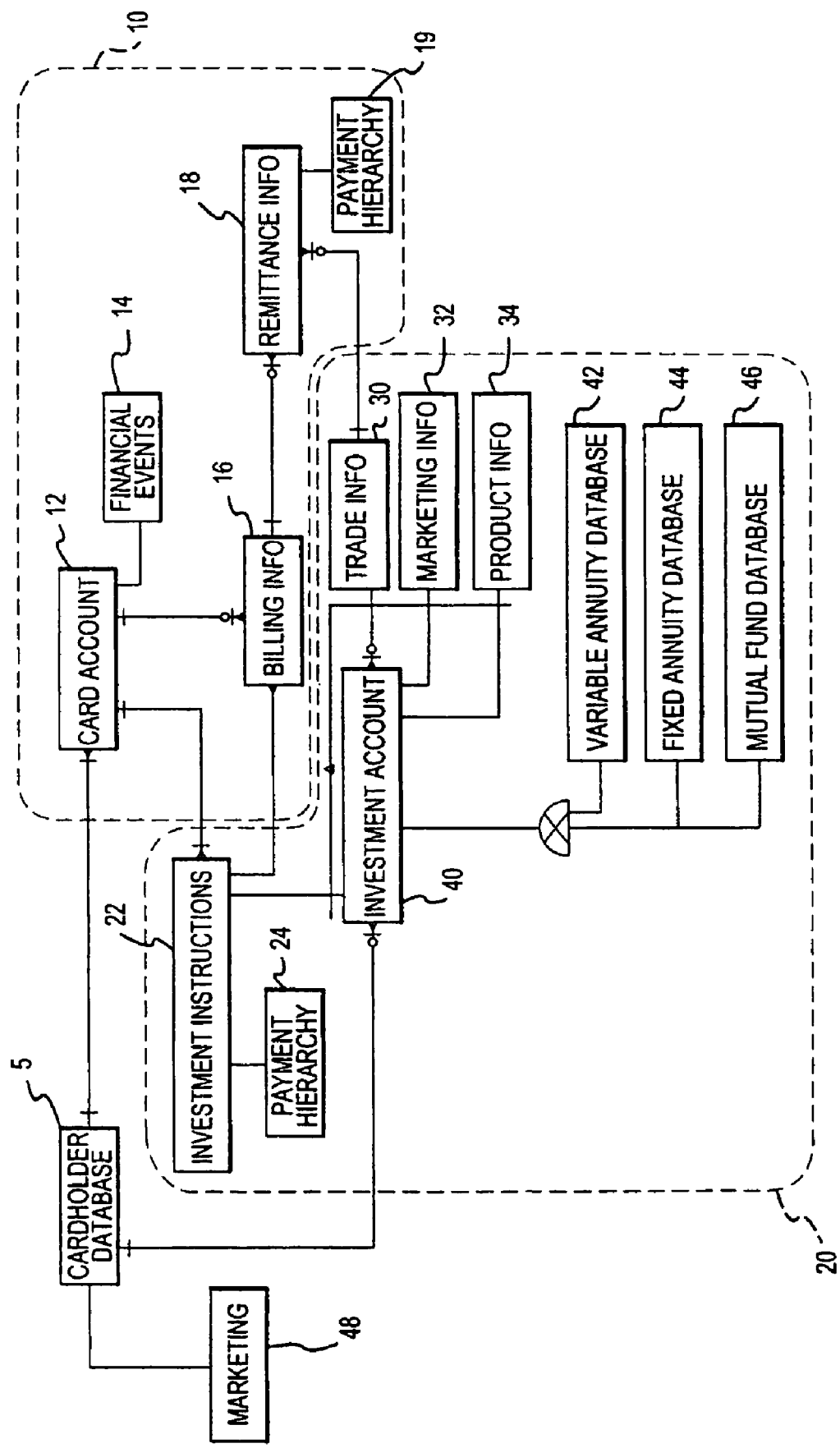
FIG. 2 is an exemplary logical data model of the data relationships and rules in accordance with one embodiment of the present invention.

In accordance with an embodiment, the present system includes a charge card billing system 10 that communicates with an investment broker system 20 as illustrated in FIG. 2 and as explained more fully below. One skilled in the art will appreciate that, as used herein, a "cardholder" includes any person or entity which uses a transaction card and participates in the present system. Similarly, a "transaction card" or "card" includes any device or code suitably configured to allow the cardholder to interact or communicate with the system, such as, for example, a charge card, credit card, debit card, prepaid card, telephone card, smart card, magnetic stripe card, bar code card, authorization/access code, PIN number, Internet code and/or the like. Thus, the cardholder may include a person who is simply in possession of an authorization or account code. Moreover, communication between the cardholder and the system exists by any suitable communication means, such as, for example, a telephone network, Intranet, Internet, point of interaction device (point of sale device, personal digital assistant, cellular phone, kiosk, etc.), on-line communications, off-line communications and/or the like. One skilled in the art will also appreciate that, for security reasons, any databases, systems or components of the present invention may consist of any combination of databases or components at a single location or at multiple locations wherein each database or system includes various security features such as firewalls, access codes, encryption, compression and/or the like.

Figure 3A:
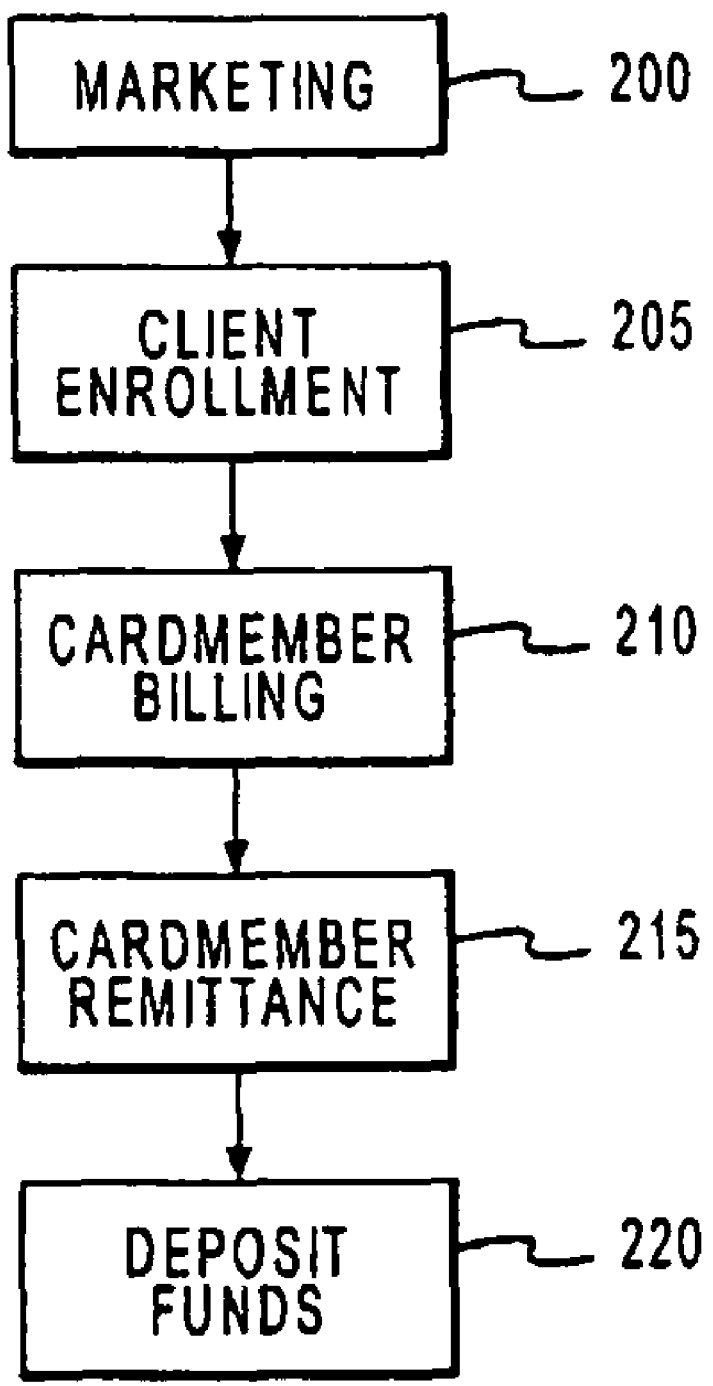
FIG. 3A is an exemplary high-level process flow diagram showing a general method in accordance with one embodiment of the present invention.

The general steps in the operation of an exemplary system are illustrated by the flowchart of FIG. 3A. An investment broker system 20 markets the benefits of the system to cardholders (step 200). An interested cardholder enrolls in the system and suitably appoints the charge card administrator as a processing agent to collect and promptly remit to the investment broker system 20 the cardholder's voluntary, periodic payments for investment into pre-selected mutual fund shares, fixed annuities, variable annuities, CDs, insurance, certificates, equities and/or the like (step 205). Billing system 10 (FIG. 2) distributes a billing statement at the end of each month, wherein the statement includes all of the charges for that month and a reminder to remit an additional dollar amount for the pre-selected investments (step 210). The cardholder then sends a single payment for the charges and the investments to the charge card administrator (step 215). After receiving the payment, the billing system 10 appropriately unbundles the payment and distributes the remitted payment to card account 12 to satisfy the charges and/or to the investment broker system 20 to purchase investment products (step 220).

More particularly, with reference to FIG. 2, the system includes a marketing system 48 having a cardholder database 5, a billing system 10 and an investment broker system 20. Marketing system 48 is any database, software, hardware, system and/or the like suitably configured to communicate with cardholder database 5, billing system 10 and/or investment broker system 20. Marketing system 48 is also configured to analyze cardholder statistics and investment product statistics, while compiling a list of cardholders which meet predetermined criteria for solicitation. The predetermined cardholder criteria includes, for example, card type, account numbers, client card address, year of birth and solicitation codes. Marketing system 48 also tracks existing cardholders' activity, investing preferences and investing patterns to further refine the client and investment product selection process. With respect to the investment products, marketing system 48 analyzes statistics for various investment products to determine the optimal investment products to offer to selected cardholders. In an embodiment, marketing system 48 suitably creates an acquisition tape of preferred cardholders and investment products and transmits the acquisition tape to investment broker system 20. In one example, marketing system 48 is the American Express MID System.

Cardholder database 5 is any database, software, hardware, system and/or the like suitably configured to communicate with marketing system 48, billing system 10 or investment broker system 20 and to accept, store and transmit cardholder information. Cardholder database 5 includes any information related to the cardholder including, for example, name, address, demographic information, social security number, date of birth, spending habit information, billing history information, credit history information and/or the like. In an embodiment, cardholder database 5 is the American Express CIM/Legacy System.

Billing system 10 is any system, software, hardware, database and/or the like which is suitably configured to organize and print billing information and/or monitor, store, audit or obtain remittance information. Billing system 10 can be an existing billing system such as, for example, the American Express Legacy Accounts Receivable System, or can be a specially configured billing system to provide the functions of the present invention. In an embodiment, billing system 10 includes card account database 12, financial events database 14, billing information database 16 and remittance information database 18. One of ordinary skill in the art will appreciate that, although billing system 10 is described as the interconnection of numerous databases, billing system 10 can be a single system or database or any combination thereof.

Card account database 12 includes any database, system, software, hardware, and/or the like suitably configured to store card account and related information. Card account database 12 may include an individual account for an individual cardholder or card account database 12 may include a plurality of card accounts for each cardholder 5 if the cardholder uses multiple cards. One skilled in the art will appreciate that card account database 12 can be an individual transaction card database, multiple transaction card databases, or a single database including transaction card information from multiple transaction card administrators. As such, card account database can include appropriate security to limit access to particular transaction card information by other transaction card administrators. For example, card account database 12 may include all American Express charge card account information. Alternatively, card account database 12 may include VISA credit card account information, American Express charge card account information, MasterCard credit card information, etc.

Financial events database 14 is any database, hardware, software and/or the like which is suitably configured to communicate with card account database 12 and merchant databases in order to monitor and capture information from merchant transactions involving the charge card. In an embodiment, financial events database 14 is an existing merchant charge card system, such as, for example, the American Express FINCAP system, which is suitably reconfigured to communicate with the present invention. One skilled in the art will appreciate that the present invention can alternatively include a financial events database which is specially configured to interact with the present invention.

Billing information database 16 is any database, software, hardware and/or the like which is suitably configured to monitor billing information and transmit billing information throughout the system and to cardholders. Billing information database 16 communicates with remittance information database 18, card account database 12 and investment broker system 20. In an embodiment, billing information database 16 includes information about each charge on a particular card by a particular cardholder. Billing information database 16 also can create billing statements (see FIG. 7) wherein the information on the billing statement includes charge card information (from financial event database 14) and investment account information (from investment instruction arrangement database 22).

Remittance information database 18 is any database, software, hardware and/or the like which is suitably configured to monitor receivables and store information about monies received from cardholders in response to a billing statement. Remittance information database 18 communicates with billing information database 16, investment system 20 and payment hierarchy system 19. Payment hierarchy system 19 is any system, software, hardware, database and/or the like suitably configured to divide and prioritize remitted cardholder payments based upon pre-established business rules for the sequence of distribution of the received funds. In other words, payment hierarchy system 19 allocates remitted cardholder funds among current and past due card charges in order to prevent the cardholder from defaulting on the cardholder's account.

With continued reference to FIG. 2, investment broker system 20 is any system, software, hardware, database and/or the like suitably configured to communicate with billing system 10, store information related to multiple investment products and apply remitted funds to multiple investment products based upon cardholder instructions. In an embodiment, investment system 20 partially includes the American Express CAMS/CATS System for multiple variable fund and fixed fund products or the Vantage System for the limited annuity products. In an embodiment, investment broker system 20 includes investment instruction arrangement database 22, payment hierarchy system 24, investment account database 40 which includes variable annuity database 42, fixed annuity database 44 and mutual fund database 46, trade information database 30, marketing information database 32 and product information database 34.

Investment instruction arrangement database 22 is any database, software, hardware, system and/or the like suitably configured to provide a set of instructions for the distribution of investment funds to the appropriate investment products and for providing remittance information for a particular investment to be included on a billing statement of a particular transaction. In an embodiment, investment instruction arrangement database 22 includes, for each investment, the period in which the investment amount appears on the billing statement, the amount to be distributed, whether the distribution is a percentage of the whole investment amount or is a predetermined amount and/or the like. Investment instruction arrangement database 22 communicates with investment payment hierarchy system 24, investment account database 40 and billing system 10. Investment payment hierarchy 24 is any system, database, software, hardware and/or the like suitably configured to determine the allocation of investment funds among pre-selected investment products. In an embodiment, investment payment hierarchy system 24 includes a set of instructions which determines the ordering in which the investment products are populated with investment monies and, if sufficient funds do not exist, investment payment hierarchy 24 determines the amount of funding, if any, for each of the investment products.

Investment account database 40 is any system, database, software, hardware and/or the like suitably configured to communicate with investment instruction arrangement database 22. Investment account database 40 is also any database suitably configured to store investment products. "Investment products" include, for example, variable annuity products 42, fixed annuity products 44 and mutual funds products 46, but one skilled in the art will appreciate that any investment product may be available such as CDs, insurance, certificates, equities, savings accounts and the like.

Information databases 30, 32 and 34 are optional features which suitably communicate with investment instruction arrangement database 22. Trade information database 30 includes information related to a particular trade or add-on to a cardholder's account, such as, for example, the number of shares and share price. Trade information database 30 suitably informs investment instruction arrangement database 22 of a remittance into remittance database 18. Marketing information database 32 includes information about a marketing campaign or effort. Product information database 34 includes information regarding an investment product which is offered by the investment broker system 20.

One skilled in the art will appreciate that investment account 40 and information databases 30, 32 and 34 are exemplary and any number of such databases may or may not communicate with the present system and provide information at any process step or to any database. Moreover, third party information databases, brokers, investment products and/or the like may also communicate with the present system in order to provide the cardholder with increased information and investment opportunities. Furthermore, the cardholder can access any of the aforementioned databases through a telephone system, touchtone response system, voice response system, Internet system or any other means for accessing data.

Additionally, the aforementioned systems and databases are exemplary embodiments; however, one skilled in the art will appreciate that numerous other databases and systems may suitably communicate with the present system in order to provide enhanced functionality and information resources for the charge card administrator and the cardholder. For example, the system may include additional functionality for establishing cardholder accounts, enrolling cardholders, billing cardholders, crediting cardholders for unpaid billings, establishing collection procedures, bypassing incompatible charge card functionalities (e.g., submitting unpaid amounts to collections, bypassing the authorization process, etc.), functionality for recovering from errors in transmissions or late transmissions, transferring monies to bank accounts, correcting misapplied payments and transmitting the funds back to the cardholder, processing withdrawals from the investment accounts, providing actuarial data to support reserve accounts, functionality to update name changes, address changes, card number changes and card status, reporting functionality, and the abilities to evaluate cardholder activity. The reporting capabilities include card reconciliation transmission reports, finance reports to track the number of client and the number of transactions, unprocessed transaction reports, credit adjustment reports, non-financial transaction reports, partial payment reports, paid more than billed reports, paid as billed reports, change request reports, file maintenance error reports and unapplied funds reports.

Figure 3B:
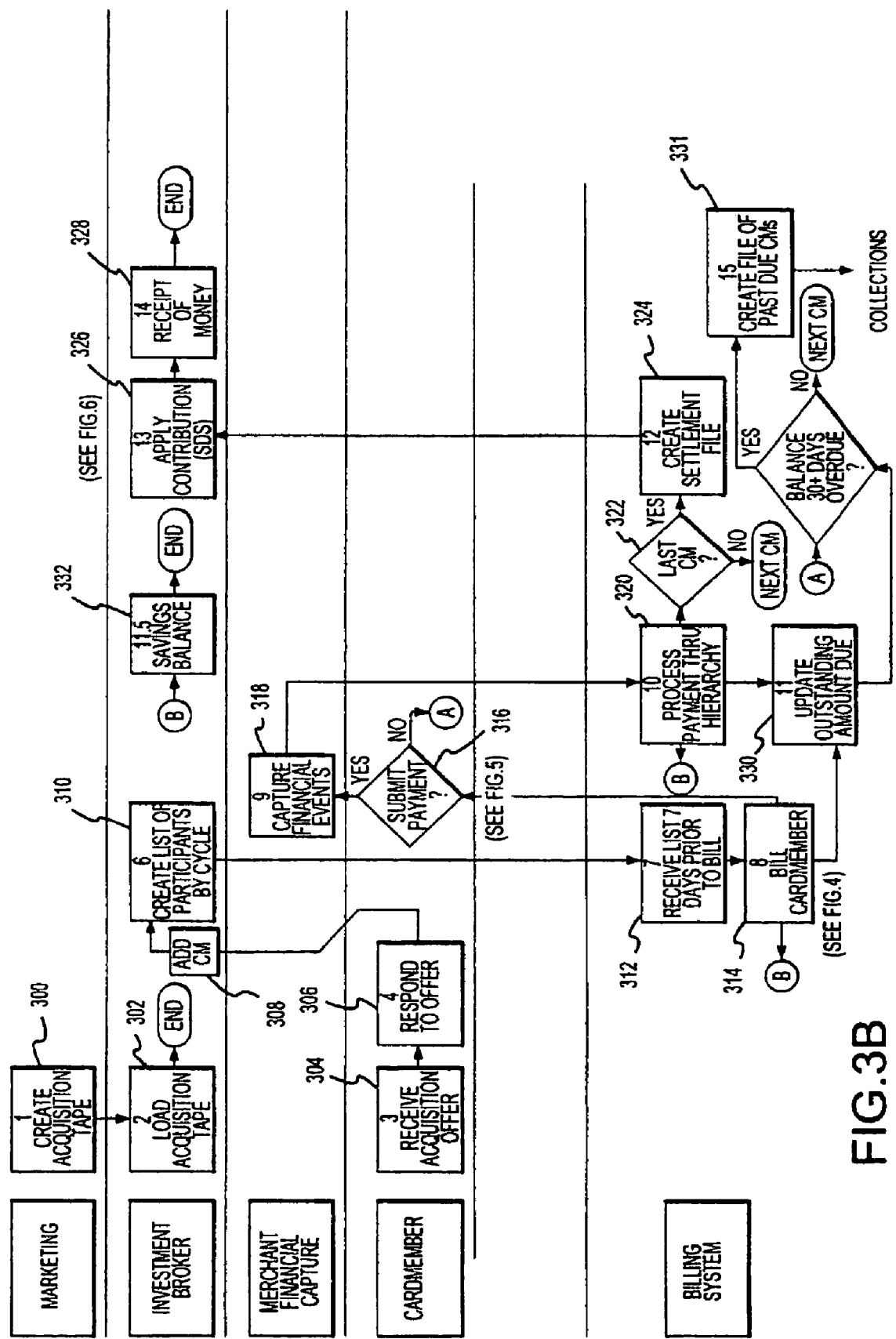
FIG. 3B is an exemplary process diagram showing a more detailed method in accordance with one embodiment of the present invention.

The operation of the system in accordance with an embodiment is illustrated by the flow diagram of FIG. 3B, along with continued reference to FIG. 2. After defining and selecting particular cardholders and investment products which meet predetermined criteria, marketing system 48 suitably creates an acquisition tape (step 300) and suitably transmits the acquisition tape to investment broker system 20. Investment broker system 20 loads the respective information from the acquisition tape into marketing information database 32 and product information database 34, along with updating cardholder database 5 (step 302). The system then transmits an acquisition (sign-up) offer to the pre-selected cardholders (step 304), via regular mail, Internet, point of interaction device or other electronic means. If the cardholders are interested in participating in the system, the cardholders respond to the offer by submitting, via regular mail, Internet, point of interaction device or other electronic means, investment instruction arrangements to the system (step 306), wherein the system stores the investment instruction arrangements for each cardholder in investment instruction arrangement database 22 while also establishing an investment account for each interested cardholder in investment account database 40 (step 308). Alternatively, any person can approach the billing system administrator or investment broker system 20, become a card member and participate in the present investment broker system.

The system then creates a list of cardholder participants who are within the same billing cycle (step 310) and the investment broker system 20 transmits the list of cardholders along with their individual investment instruction arrangements to billing information database 16 at least seven days prior to the end of the particular billing cycle (step 312). In an embodiment, the list of cardholders created by investment broker system 20 includes a file of billing statements based on the cardholder's billing cycle, wherein the number in the tenth field of the cardholder's account number determines the type of billing cycle (e.g., an "8" in the tenth field of the cardholder account number instructs billing system 10 about which of the monthly billing cycles to use). The list of cardholders also includes, for each cardholder, card account number, policy number, bill amount, the month the contribution represents, service establishment number, product name, an 800 number (for the cardholder to obtain more information about the investment product) and investment product service team location (informs the cardholder where the particular customer service representatives are located). With respect to a service establishment number, each investment broker system 20 is considered a different "service establishment" (or company/merchant) within the system in order to simplify the incorporation and recognition of the investment system into billing system 10. Alternatively, the investment broker system 20 may be listed separately on billing statements without reference to a service establishment number.

Figure 4:
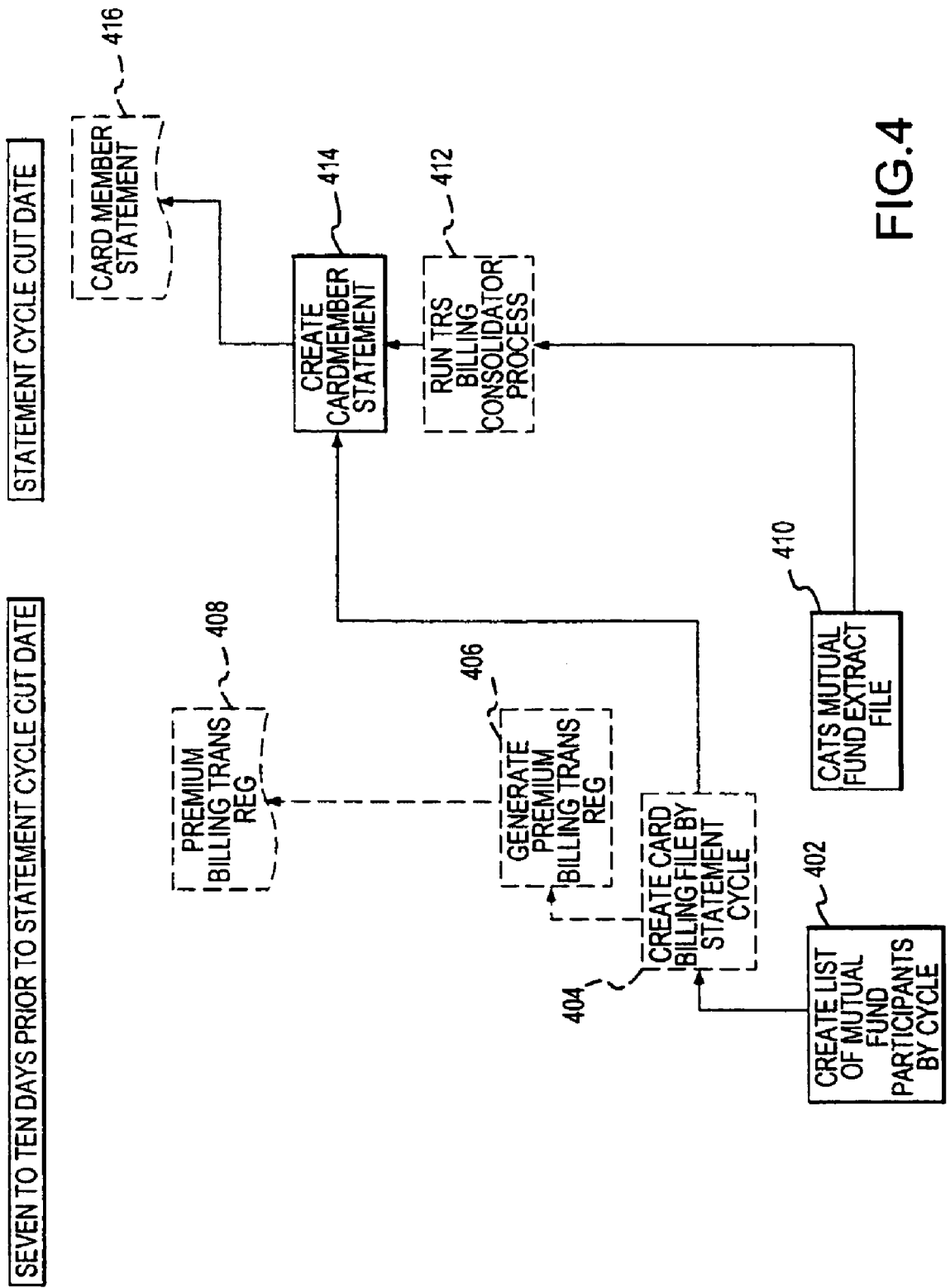
FIG. 4 is an exemplary flow diagram showing a more detailed method of the cardholder billing process for mutual funds in accordance with one embodiment of the present invention.

Billing information database 16 next suitably prepares and transmits a billing statement to the cardholder, wherein the billing statement includes the aforementioned information received from investment broker system 20. At the same time the billing information is sent to billing information database 16, an extract file is transmitted to remittance database 18. More particularly, with reference to FIG. 4, investment system 20 suitably creates a list of investment product cardholders which all share a similar statement cycle (step 402). Investment system 20 then assigns a particular investment product(s) within an arrangement database (an arrangement database includes multiple investment product offerings) with an active status for each statement cycle. For each cardholder on the list, the system stores additional information such as, for example, card number, date, billing amount, vendor name (such as American Express Financial Advisors Inc.), city/state, contribution period, product name and account identification number.

The system then creates a card billing file for each statement cycle, wherein the billing file consolidates all cardholders and adds a telephone number, reference number and ROC (record of charge) number for each record at the time of consolidation (step 404). After creating the card billing file, in an alternative embodiment, the system suitably generates a premium billing transmittal register which is a summary by CAP (central affiliated property) number (overall company number, e.g. Wal-Mart) and service establishment number (specific store, e.g. Wal-Mart on 6th Street in Phoenix, Ariz.) of the number of records and amounts included on each billing cycle (step 406). The premium billing transmittal register is then suitably transmitted to billing system 10 (step 408). In an embodiment, after creating the card billing file (step 404), a cardholder statement is suitably created at billing information database 16 (step 414) and the cardholder statement is subsequently mailed to the cardholder (step 416). At the same time as the billing information is transmitted, the investment broker system 20 creates an investment product extract file which includes card numbers for all investment broker system 20 card authorization arrangements having both active and inactive arrangements (step 410). The investment product extract file is then suitably transmitted to billing system 10 which runs a billing consolidator process (step 412) and then creates the cardholder statements (step 414) which are subsequently mailed to the cardholders (step 416).

In an embodiment, as illustrated in FIGS. 3B, 7A and 7B, and with continued reference to FIG. 2, the investment product amount owed is incorporated into a known charge card billing statement. Thus, the cardholder receives a consolidated billing statement which includes charge card expenditures 705 along with a desired investment product amount 710 (FIG. 7A shows an exemplary billing statement summary page and FIG. 7B shows an exemplary billing statement detail page). After the cardholder is suitably billed by billing system 10 (step 314), the system stores the billing information within a savings balance database (step 332). The savings balance database is any database suitably configured to store the pending investment contribution balance of each card, wherein the balance includes the billed, received and outstanding amounts. After receiving the billing statement, the cardholder submits payment to the charge card administrator by drafting and submitting any suitable negotiable instrument to the charge card administrator. The cardholder may receive the billing statement through regular mail, Internet or other electronic means and the cardholder may remit payment via similar means. Upon remittance of the payment to the charge card administrator, the remittance information is suitably inputted and stored in remittance information database 18 (step 316).

The received payment is suitably unbundled by processing the payment through payment hierarchy 19 (step 320) to determine the appropriate dollar amount per client to be applied to the appropriate financial events (step 318) and investment products. The financial event allocation is determined by an analysis of the financial capture information, wherein the financial capture information represents the merchant charges incurred by the cardholder. The financial event database 14 captures information from any system suitably configured to retrieve, sort and store financial event information, such as, the American Express FINCAP system. Payment hierarchy 19 suitably determines any outstanding amounts due (step 330) and creates a settlement file of all cardholders (step 324) which includes the appropriate allocation of the cardholders' remitted funds. In other words, billing system 10 reviews the remitted amount from each cardholder (step 322), then consolidates, each day, all remitted amounts into a single settlement file which is transmitted to investment broker system 20. As discussed above, prior to beginning the investment arrangement with the charge card administrator, the cardholders provide investment instruction arrangements for the specific investment products and the amount they intend to invest on a monthly basis to investment instruction arrangement database 22. Based upon the previously submitted instructions stored in investment instruction arrangement database 22, investment broker system 20 allocates the remitted amounts to the appropriate investment product account 40 (step 326).

With respect to the outstanding financial event amounts due from each cardholder (step 330) in a typical billing cycle, billing system 10 creates a file of past due cardholders (step 331) and transmits the file to a suitable collections system, such as, for example, the American Express TPNS collections system, which communicates with the cardholder to appropriately resolve the past due accounting issues. With respect to investment funds, investment system 20 communicates with billing system 10 to stop the collection process because the investment funds are not required payments.

Figure 5:
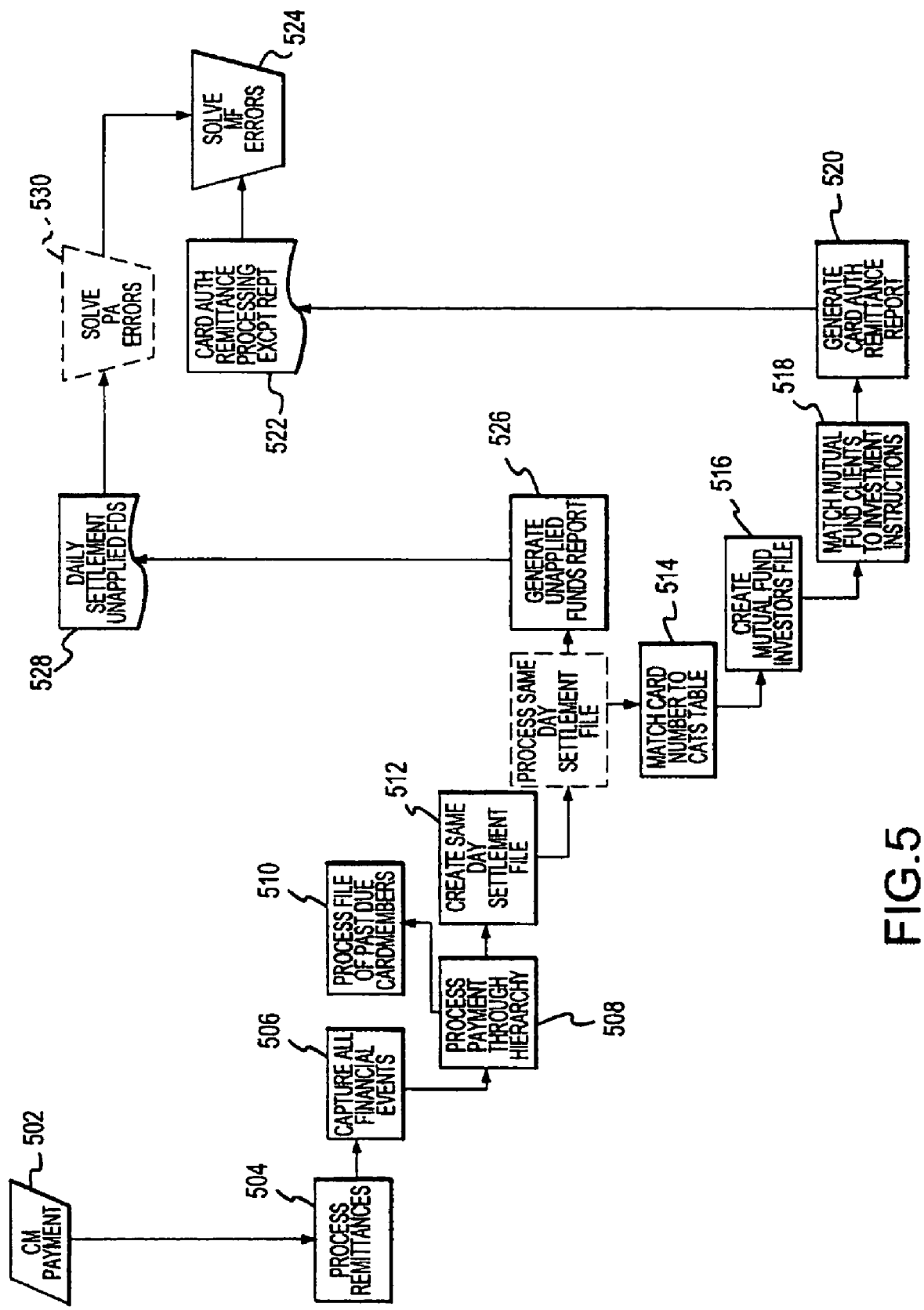
FIG. 5 is an exemplary flow diagram showing a more detailed method of the cardholder remittance process for mutual funds in accordance with one embodiment of the present invention.

More particularly, with reference to FIG. 5, after the cardholder submits payment to billing system 10 (step 502), billing system 10 suitably processes the remittances (step 504) through payment hierarchy system 19 which applies a payment hierarchy to the remitted funds to determine the ordering for applying payments to the outstanding amounts owed to the financial events (step 508). The financial events are card charges at merchants which were previously incurred by the cardholders and which were previously captured by billing system 10 and stored in financial event database 14. If the remitted funds are insufficient to satisfy the amount owed to merchants for the financial events, billing system 10 suitably processes a file of past-due cardholders (step 510) wherein the file of past-due cardholders is forwarded to a collections system.

In an embodiment of the present invention, investment broker system 20 includes its own investment payment hierarchy system 24. Thus, while payment hierarchy system 19 processes the remitted payment with respect to the financial events located in financial event database 14, investment payment hierarchy system 24 processes the remitted payments to determine the allocation of funds to the pre-selected investment products. For example, if the cardholder instructions include $50 to Mutual Fund A and $25 to Annuity B each month, yet the cardholder only submits an additional $20, investment payment hierarchy may apply $15 to Mutual Fund A and $5 to Annuity B.

However, if the cardholder submitted insufficient funds to satisfy the intended allocation to the investment products, the collections system of billing system 10 will not include the cardholder in the past-due cardholder file (as long as the remitted funds satisfy the amounts owed for the financial events). In other words, because participation in the investment products is voluntary, if the cardholder does not submit a sufficient amount of additional funds to satisfy the intended allocation to the investment products, the collections system does not submit the cardholder account to the collections system and the system does not charge interest for the unpaid investment funds.

Moreover, the collections system monitors the non-payment of investment funds. Particularly, if the cardholder does not submit the selected investment funds for a predetermined number of days, e.g., 60 days, the collections system will remove the cardholder from card account 12 of the billing system 10 and the billing statement will no longer include a reminder to submit the investment funds. In an embodiment, the collections system is the American Express TPNS system.

While payment hierarchies 19 and 24 suitably apply the appropriate business rules to determine the hierarchy of payments to the specific financial events and investment products, respectively, one of ordinary skill in the art will appreciate that payment hierarchy systems 19 and 24 include any system suitably configured to determine the appropriate allocation of remitted funds to internal charges or products and/or to third party charges or products. In an alternative embodiment, the present system may charge a fee to the cardholder for applying the remitted funds to third party investment products.

For the cardholder investment products in which sufficient remittances are received, the billing system 10 creates a settlement file, e.g., within the same day as the receipt of funds, which includes the card account number, remittance amount and/or credit amount (step 512). The billing system 10 then transmits the settlement file to investment broker system 20 which, on the next day, matches the card account number to the pre-selected investment products within investment instruction arrangement database 22 to verify that the investment products were pre-selected. The newly-created investment product file is passed to the investment account database 40 to apply the remittances to the individual product accounts. The remittances are then matched to the investment instruction arrangements within investment instruction arrangement database 22 by matching the card number to the investment broker system 20 account identification and matching the remittance amount to the percent allocation (step 518). Additionally, any credit amount which exists is identified for future reporting. The system then applies the remitted funds to the active (selected) arrangements within investment instruction arrangement database 22 (step 514).

An investment product file which includes a date, card number, remittance amount or credit amount for each record is created within the arrangements of investment instruction arrangement database 22 (step 516). Investment broker system 20 then generates a card authorization remittance report (step 520) and the report is cross-checked for unmatched card numbers, remittances, credits and debits (step 522). If any errors exist, investment broker system 20 resolves any exceptions on the card (step 524) and provides an Authorization Remittance Processing Exception Report.

Moreover, after investment broker system 20 receives the settlement file from billing system 10, investment broker system 20, if appropriate, generates an unapplied funds report and/or an error report (step 526) In an embodiment, the unapplied funds settlement report is transmitted to investment broker system 20 to suitably inform investment broker system 20 of the investment fund errors and allows investment broker system 20 to resolve the investment fund errors (step 528 and 530). In an embodiment, the settlement file is comprised of two files which each include a record for each remittance, wherein the record includes the card number, remittance amount and service establishment number.

With momentary reference to FIG. 3B, after investment payment hierarchy system 24 determines the appropriate allocation of the investment funds to particular investment products, investment instruction arrangement database 22 organizes the particular cardholder investment product purchase request in an arrangement database. Based upon the arrangement database within the investment instruction arrangement database 22, the system trades or applies cardholder investment funds to create orders for investment products, execute trades from the investment funds, and apply the purchase payments to the appropriate investment product (step 326). After applying the contribution requests to the appropriate investment product, the investment products are funded with the money from the consumer remittance (step 328).

Figure 6:
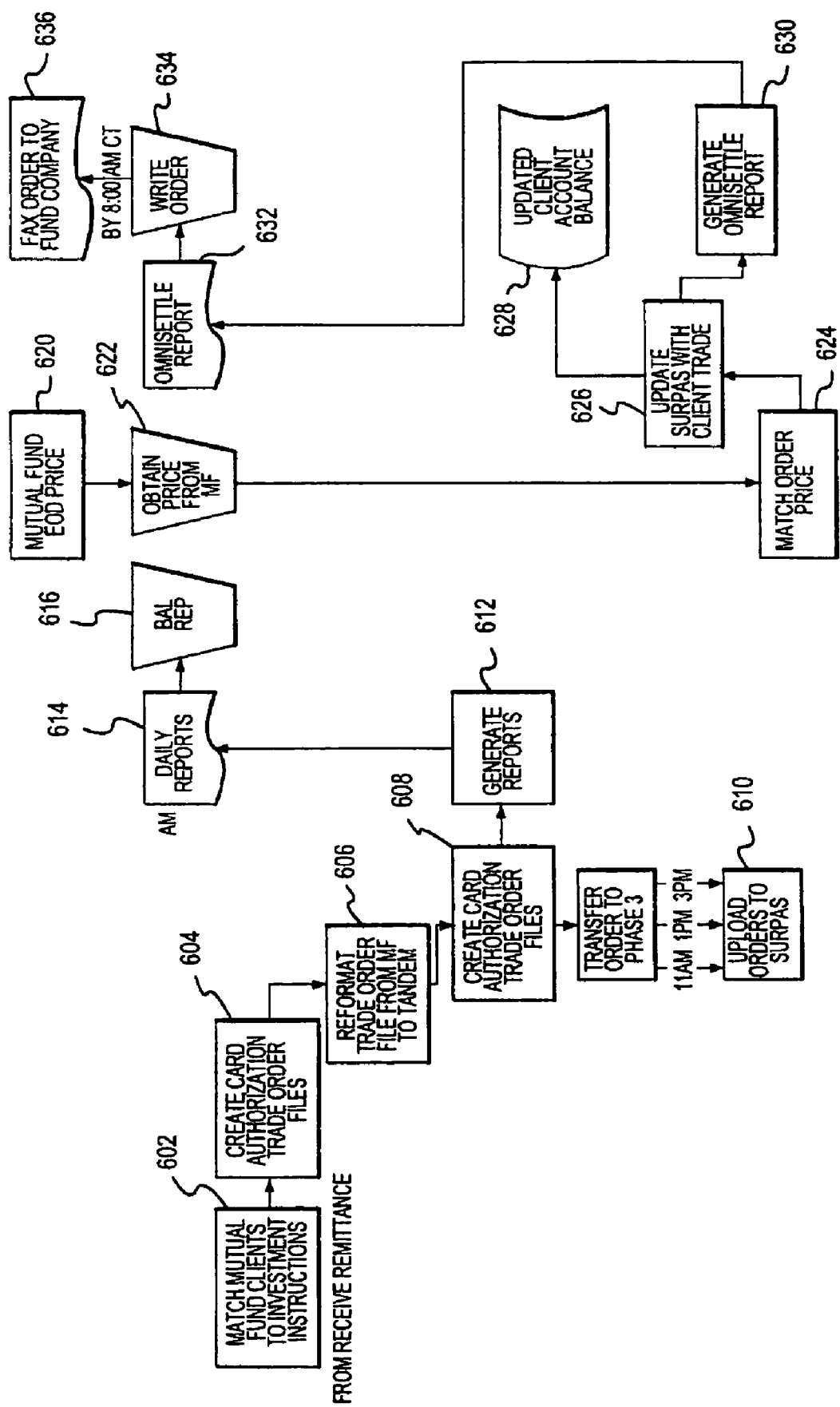
FIG. 6 is an exemplary flow diagram showing a more detailed method of the create order and execute order process for mutual funds in accordance with one embodiment of the present invention.

More particularly, with reference to FIG. 6, upon receipt of the settlement file from billing system 10, investment broker system 20 utilizes the cardholder information within the settlement file to suitably obtain the particular investment instruction arrangements for each cardholder from investment instruction arrangement database 22 (step 602). Upon matching the cardholders with the investment instruction arrangements, investment broker system 20 suitably creates trade order files which include a date, investment broker system 20 identification, ticker symbol, order amount and summary of total dollars (step 604). In an embodiment, the trade order files are reformatted to allow processing by a suitable trading system (step 606), wherein the trading system communicates with the present invention. The orders are further supplemented with the appropriate trade information, such as, for example, an identification of the investment trade, a translation from the code account to a sweep fund, and an identification of the order as a qualified or non-qualified order (step 608). In an alternative embodiment, the no-load or other non-proprietary orders (investment products not offered by the investment broker system 20) are provided with a routing code to allow the order to be uploaded to another external system for further processing (step 610).

In one example, after investment broker system 20 creates the trade order file, the system generates reports such as, for example, card authorization order transactions, IRA cash transactions, non-IRA cash transactions, daily activity file counts, and/or the like (step 612). The reports are then suitably transmitted to billing system 10 wherein billing system 10 allows the reports to be suitably available to billing system management (step 614). Alternatively, the reports may be available to the cardholder via regular mail, facsimile, Internet or any other electronic means. The daily reports generated by the system also include a balance of the cardholder's investment funds (step 616). In an embodiment, to create the orders, execute the orders and execute the trades, investment broker system 20 includes any combination of systems suitably configured to perform the aforementioned functions such as, for example, the American Express Phase 3 and SURPAS systems which use the Tandem code and the SPTG (Special Products Technical Group) system for translating mainframe code to Tandem code.

With respect to the pricing of the investment products, investment broker system 20 or a third party investment product company suitably establishes an end-of-the-day price for the investment product (step 620) and investment broker system 20 suitably obtains the investment product price from the third party investment product company (step 622). The price is obtained manually, but one skilled in the art will appreciate that the price may be obtained automatically via software, electronic transfer or other mode of transmission. Investment broker system 20 suitably matches the previously created trade order file with the investment product price (step 624). The system then updates the trade order file with the price of the client trade (step 626) and appropriately updates the client account balance (step 628) within investment account database 40. Additionally, investment broker system 20 suitably generates a settlement report (step 630) and suitably transmits the report to investment broker system 20 (step 632) which, in turn, writes the order (step 634) and suitably transmits the order to the investment product company, before the trading market opens, to allow the investment product company to execute the trade (step 636).

One skilled in the art will appreciate that the transmission of the reports and orders is executed in any appropriate manner for transferring the information including manual reporting, facsimile, electronic reporting or other suitable mode of transmission. Moreover, in an alternative embodiment, the aforementioned functions for providing reports, obtaining investment product information, or writing orders can be accomplished by any third party business unit such as, for example, a investment broker system 20 house. In an embodiment, depending on securities regulations, trade information database 30 prices the variable investment product, such as mutual funds, within 24 hours after investment broker system 20 receives the cardholder funds. In an embodiment, investment broker system 20 receives the settlement file and processes the file into trade orders and credits the card member account. The reconciliation report discussed above is faxed to the cardholder on the morning of day 3 (three days from receiving the cardholder remittance). To conform with the appropriate securities regulations, all of the aforementioned transmission steps may be subjected to specific time of day turnaround requirements.

One skilled in the art will appreciate that, after the remittance process (step 215), the system may incorporate any number of capabilities and functionalities which suitably enhance efficiencies and customer service. For example, the system may confirm investment product orders and trades, reconcile account balances, provide client statements, incorporate tax reporting summaries and suggestions, generate refund checks, reconcile money transfer amounts, process investment product withdrawals, wire transfer money and/or redeem mutual fund shares. Additionally, the system may provide manual or automatic services for managing client inquiries and requests and maintaining client data. Furthermore, cardholders may make withdrawals and changes to their investment broker system 20 accounts or terminate participation in the service by calling a toll free number, submitting an Internet request or any other suitable communication means. If cardholders want to change the amount they wish to invest, the cardholders can simply communicate with the investment broker system 20 through the normal investment process which may include, for example, calling a customer service representative, faxing requests to the broker, entering changes electronically through the Internet or any other suitable communication means.

Furthermore, since each investment is voluntary, non-payment of the investment amount will not affect the cardholder's ability to charge on the charge card and the unpaid investment amount will not accrue interest or other charges. Moreover, the cardholders are not exposed to any risk of loss by using the charge card administrator as a processing agent for their intended investment amounts because, in an embodiment, the investment broker system 20 takes full responsibility for the safety of the funds from the time the intended investment amount is received by the charge card administrator until the time of investment. Thus, as discussed above, after receiving the billing statement each month, the cardholder sends a single check for both regular charge card purchases and for the purchase of the investment products. However, since the payment contribution is voluntary, the cardholder can choose not to pay without an impact to their overdue account balance.

Particularly, the charge card administrator does not hold or control the remitted investment funds because the charge card administrator only handles the funds pursuant to the cardholders' direction to transfer the funds. The billing system deposits the funds into the investment account database 40 based on the cardholder's instructions in investment instruction arrangement database 22. Moreover, the charge card administrator will not forward any funds until the remitted investment funds are received by the charge card administrator. In other words, the cardholder does not charge the investments to his charge card account; rather, the card member remits the investment funds to the charge card administrator which in turn remits the investment funds to the investment broker system 20. Additionally, as discussed above, in order to avoid any "requirement" to submit investment product payments, the portion of the remitted amount to be applied to the investment product bypasses the regular charge card authorization process, and thus, if the investment product funds are not received, the system will not transmit the cardholder account to the collections system.

Exemplary Savings Embodiment(s)

Figure 8:
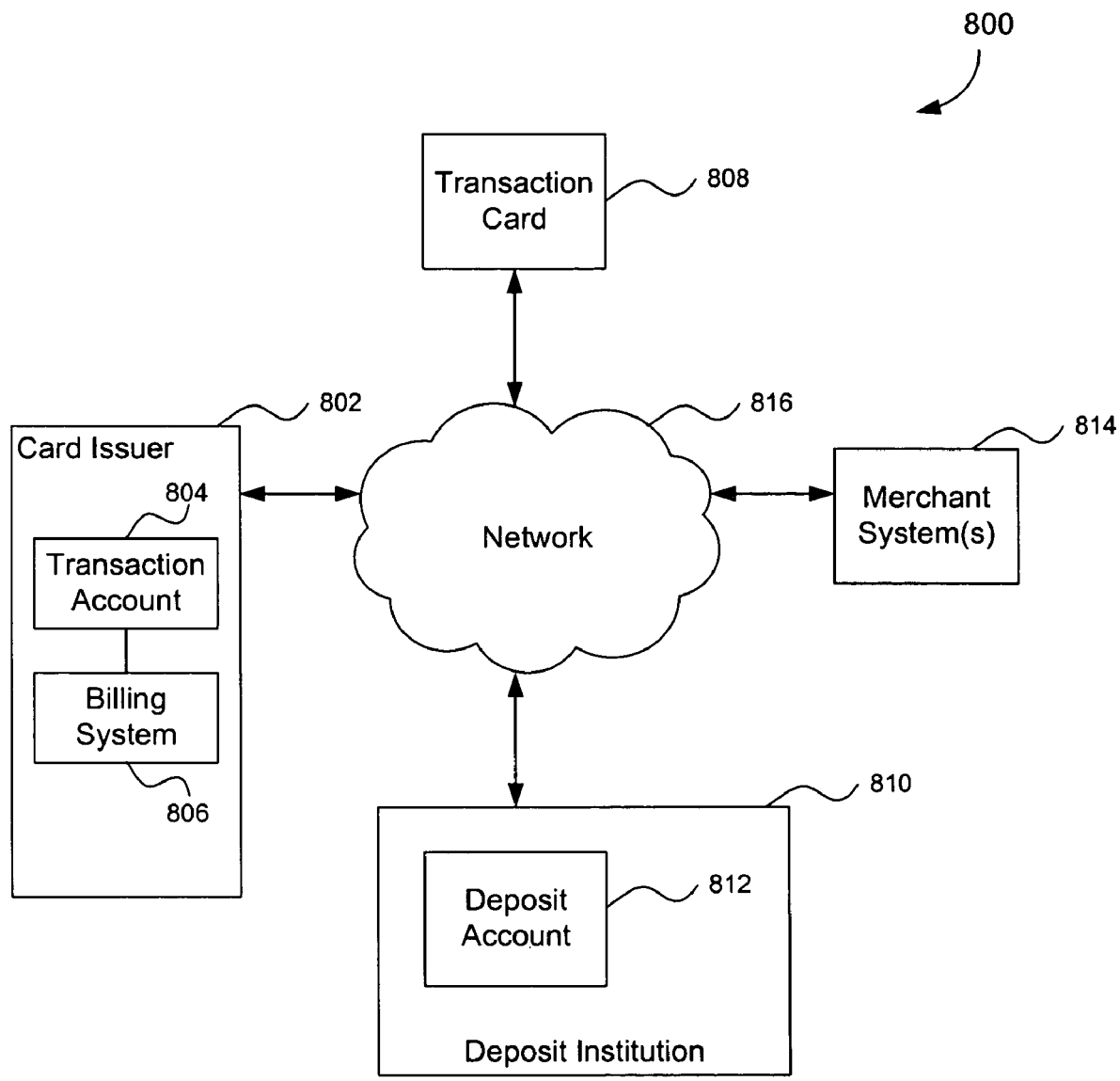
FIG. 8 shows a system 800 that includes features of the present invention.

FIG. 8 shows a system 800 that includes features of the present invention. System 800 includes a card issuer 802 having at least one transaction account 804 and a billing system 806, a transaction card 808 held by a cardholder that is associated with the transaction account 804, a deposit institution 810 having at least one deposit account 812 that is owned by the cardholder, and at least one merchant system 814. Providing of a transaction card can be, alternatively, done by an issuer/provider or a third party who issues the card on behalf of the provider. In one example, transaction card issuer 802, deposit institution 810, transaction card 808, and merchant system 814 are all coupled either via a wired, wireless, or combination network 816, for example an Internet, Intranet, telecommunications network, or the like. It is to be appreciated that, although shown as separate entities in separate locations, card issuer 802 and deposit institution 810 can be a same entity and housed in a same location, for example when card issuer 802 is a bank at which the customer also maintains a deposit account 812. In an alternate embodiment, card issuer 802 and deposit institution 810 can be affiliated companies.

For example, system 800 can be used to establish and operate a savings program that allows a cardholder to have funds deposited from the cardholder's transaction account 804 into designated ones of the cardholder's one or more deposit accounts 812 (hereinafter deposit account is mean to include one or more accounts), either once or on a recurring basis, as discussed in more detail below. This can be done either automatically or only through authorization each period by the cardholder, depending on criteria established by card issuer 802, the cardholder, or both. For example, each period can be, but is not limited to, monthly, semi-annually, bi-annually, or annually.

In one example, no loyalty reward points (e.g., American Express Membership Reward® program points) typically awarded by the issuer and credited to the transaction account are earned through use of the savings program. Thus, any amount of funds designated for deposit into a deposit account do not count toward reward points.

In one example, the savings amount is shown as a mandatory charge, for which the cardholder is obligated to pay (i.e., an "record of charge" (ROC) appears on the cardholder statements. Thus, the savings amount "charge" is independent from, and indifferentiable to, from any other "normal" charges for goods and services on the cardholder's billing statement by billing system 106. As such, the savings amount ROC is treated like any other charge and any delinquent payments associated with the savings amount can be reported by issuer 802 to a credit bureau "business as usual." Therefore, because the cardholder has committed to paying the savings amount, the cardholder can have the funds deposited by issuer 802 immediately when (or concurrently with) the ROC appearing on transaction account 804 or at any other time, which allows for immediate access to the savings amount funds. This allows the cardholder to take advantage of the "float." That is, the cardholder can take advantage of the time period from which the mandatory charge appears on the cardholder's as a ROC—which indicates that the funds have been deposited by issuer 802 into deposit account 812—until the cardholder actually pays their periodic (i.e., monthly) bill.

In order to allow for funds to be deposited from the cardholder's transaction account 804 into the cardholder's deposit account 812, the two accounts are associated, for example, in billing system 806.

In one example, the cardholder can establish a specific amount of funds (e.g., $10.00, $20.00, etc.), while in another example card issuer 802 can establish funds based on, for example, a percentage of a total amount of monthly transactions (e.g., 1% of the total transactions, similar to a 1% cash back program). Alternatively, both the cardholder and the card issuer can deposit funds into the deposit account using the two different criteria discussed above. In one example, the percentage is universal and is not tied to any particular merchant or product. The cardholder receives the flat rate percentage (e.g., 1%) no matter which product/service is purchased and no matter which merchant supplied the products/services. It is to be appreciated that other criteria can also be used to establish an amount of funds to be deposited.

In one example, billing system 806 can be any system that allows for monitoring of transactions occurring on transaction account 804, periodic bill generation of the transactions, and archiving of transactions. When used in the savings program discussed above and below, billing system 806 can also include information or instructions as to an amount and timing of funds to be deposited into the cardholder's deposit account 812, as described in more detail below.

In one example, purchases from a merchant system 814 can be made using transaction card 808 over the Internet (i.e., a "card not present" transaction), which purchases are recorded in transaction account 804. In another example purchases can be at a merchant system 814 (i.e., a "card present" transaction) using the transaction card 808, which are also recorded in transaction account 804.

In one example, the cardholder may obtain information on deposit account 812 via any device (e.g., voice response, phone, internet, statements, etc).

In one example, the cardholder may also be able to use the same transaction card 808 to deposit funds or withdraw funds from deposit account 812.

FIG. 9 shows a savings portion 910 of a consolidated billing statement (e.g., as shown in FIGS. 7A and 7B, as discussed above), according to one embodiment of the present invention. Thus, either in place of or along with investment portion 710, a consolidated billing statement can include a savings portion 910. In the example shown, savings portion 910 includes various types of information, for example, but not limited to, Date, Deposit Institution Name/Routing Number, Deposit Account Number(s), Reference Number, or the like. In this way, a cardholder is alerted to an amount of funds being deposited into the deposit account (or that have already been deposited into their deposit account, as discussed above and below) on their normal billing statement. Alternatively, when more than one deposit account is being deposited to, all deposit account information can be provided on the savings portion 910 and/or the savings portion 910 and the investment portion 710. In another example, savings portion 910 and/or investment portion 710 can include information relating to what entity, the card holder or the card issuer, or both, is making a deposit into the designated account(s).

FIGS. 10 to 13 show alternative ways of establishing and operating a system and method that deposit funds from a transaction account into a deposit account depending on whether there is automatic or decision-based depositing of the funds, or the use of other criteria for determining an amount or timing of the deposit, as discussed below. As will be appreciated by those skilled in the relevant art(s) after reading the description herein, although FIGS. 8-13 are discussed in terms of deposit accounts, in alternate embodiments, investment accounts may be employed as well.

Figure 10:
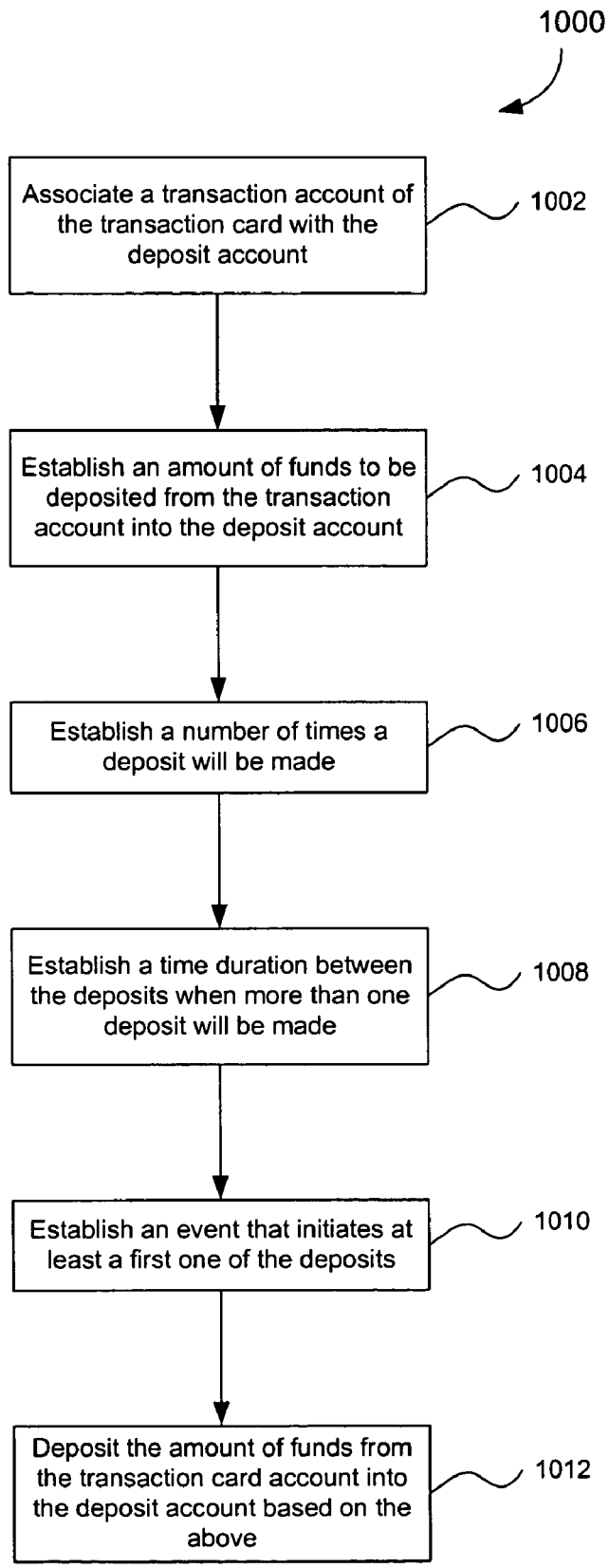
FIGS. 10, 11, 12, and 13 show flowcharts depicting various methods, according to various embodiments of the present invention.

FIG. 10 shows a flowchart depicting a method 1000, according to one embodiment of the present invention.

In step 1002, a transaction account of the transaction card is associated with the deposit account. For example, this can be based on the cardholder of the transaction card instructing the issuing company of the transaction card what account the savings should be deposited into. In another example, this can be an account established by the issuing company when the cardholder applies for and establishes account 804 (or otherwise enrolls in the savings program). Other variations are also contemplated within the scope of the present invention.

In step 1004, an amount of funds to be deposited from the transaction account into the deposit account is established. In step 1006, a number of times a deposit will be made is established. In step 1008, a time duration between the deposits when more than one deposit will be made is established. In step 1010, an event that initiates at least a first one of the deposits is established. In step 1012, the amount of funds from the transaction card account is deposited into the deposit account based on one or more of the above steps, e.g., steps 1004 to 1010.

It is to be appreciated that establishing steps 1004 through 1010 can be based on instructions from the issuing company, the cardholder, or both in various or alternative implementations of this embodiment of the invention. For example, as discussed above, the issuing company can determine a certain percentage cash back that will be deposited in the deposit account each month, or in another embodiment, the cardholder can instruct the issuing company to deposit, for example, $100.00 monthly into deposit account 812. In another example, issuing company 802 can either deposit the money after the billing cycle has ended or after the cardholder has actually paid (at least a portion of, or the entire) bill, depending on the type of savings program being operated. These different scenarios are also contemplated, as appropriate, for the alternative savings processes described below.

Figure 11:
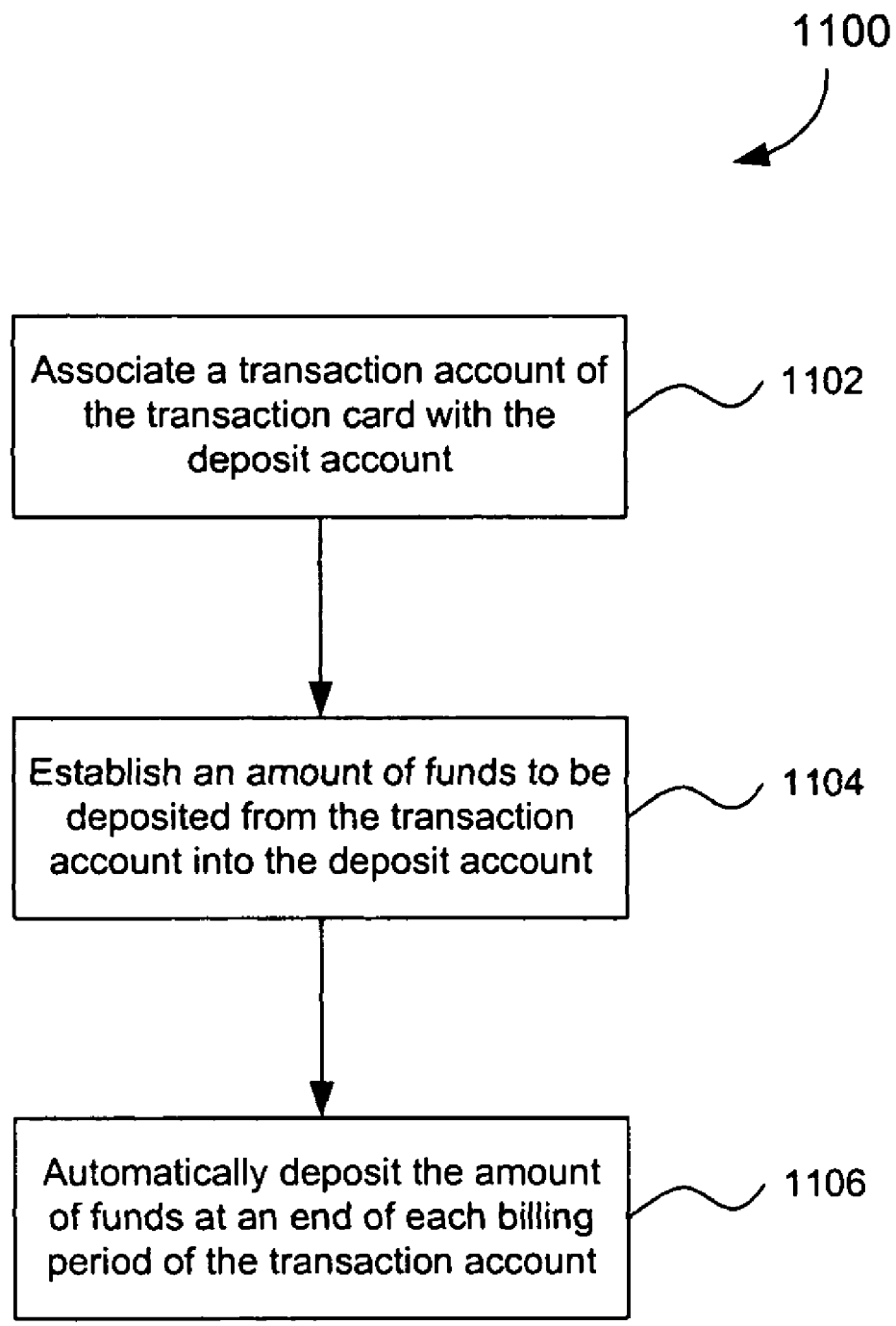

FIG. 11 shows a flowchart depicting a method 1100, according to one embodiment of the present invention. In step 1102, a transaction account of the transaction card is associated with the deposit account. This can be done as described above in relation to step 1002. In step 1104, an amount of funds to be deposited from the transaction account into the deposit account is established. In 1106, the amount of funds is automatically deposited at an end of each billing period of the transaction account.

It is to be appreciated that establishing step 1104 can be based on instructions from the issuing company, the cardholder, or both in various or alternative implementations of this embodiment of the invention, as discussed above.

Figure 12:
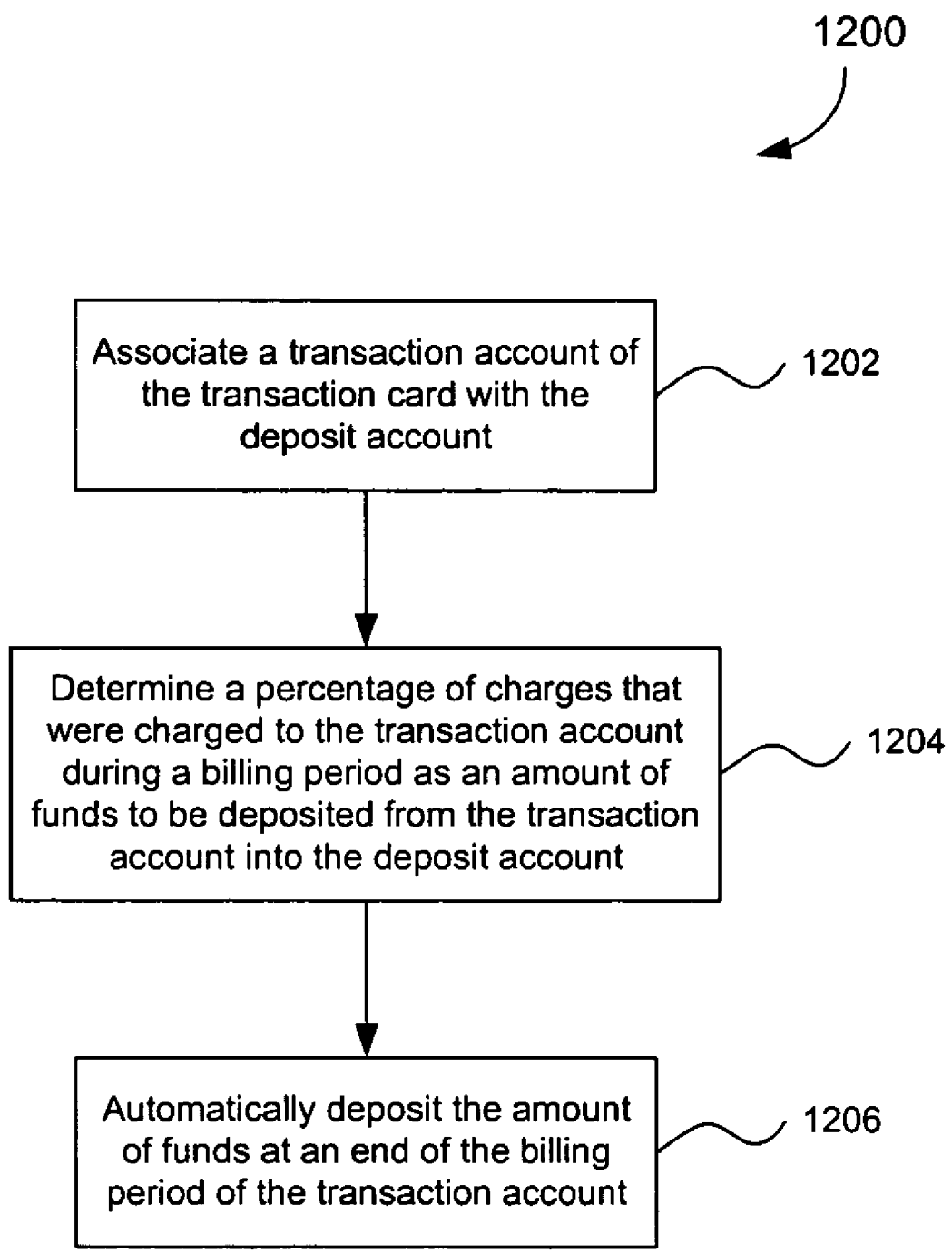

FIG. 12 shows a flowchart depicting a method 1200, according to one embodiment of the present invention. In step 1202, a transaction account of the transaction card is associated with the deposit account. This can be done as described above in relation to step 1002. In step 1204, a percentage of charges that were charged to the transaction account during a billing period is calculated as an amount of funds to be deposited from the transaction account into the deposit account. In step 1206, the amount of funds is automatically deposited at an end of the billing period of the transaction account or after the cardholder has actually paid (at least a portion of, or the entire) bill.

Figure 13:
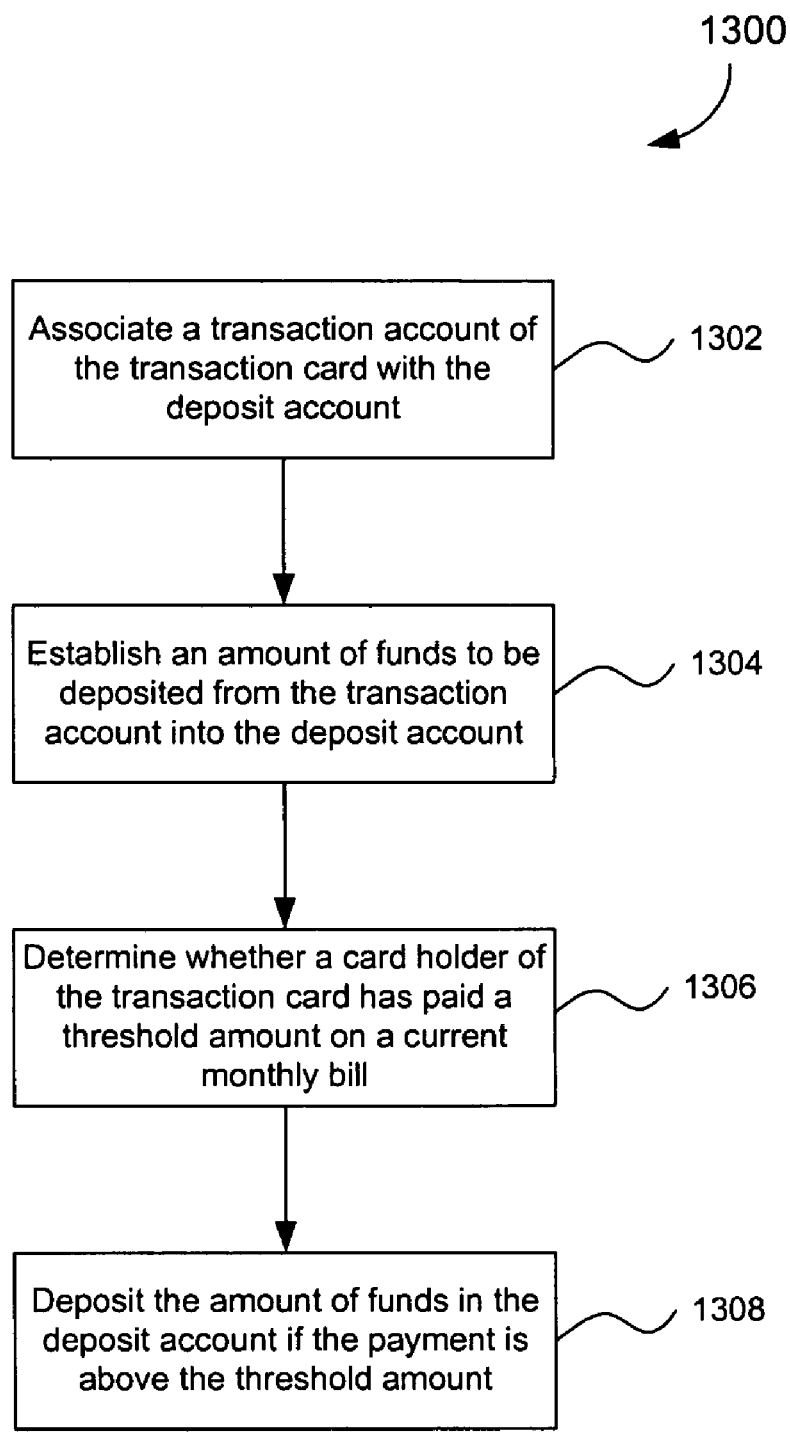

FIG. 13 shows a flowchart depicting a method 1300, according to one embodiment of the present invention. In step 1302 a transaction account of the transaction card is associated with the deposit account. This can be done as described above in relation to step 1002. In step 1304, an amount of funds to be deposited from the transaction account into the deposit account is established. In step 1306, a determination is made whether a cardholder of the transaction card has paid a threshold amount on a current monthly bill. For example, this threshold amount can be, but is not limited to, one of: (a) the total amount charged for the month (or a total amount of current and past due charges) plus the established deposit amount of funds, or (b) a minimum payment established by the issuing company plus the established amount of funds. In one example, the cardholder may also have to re-authorize monthly, bi-yearly, periodically, or the like, that they want any amount in excess of their actual bill (i.e., the total amount billed for charges in the last billing cycle) or a minimum amount due paid to their deposit account each month. In step 1308, the amount of funds is deposited in the deposit account if the payment is above the threshold amount.

Example Implementations

The present invention (i.e., systems in FIGS. 2 and 8, processes in FIGS. 3A, 3B, 4-6, and/or 10-13 or any part(s) or function(s) thereof) may be implemented using hardware, software or a combination thereof and may be implemented in one or more computer systems or other processing systems. However, the manipulations performed by the present invention were often referred to in terms, such as receiving or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include point of sale terminals, general purpose digital computers or similar devices.

Figure 14:
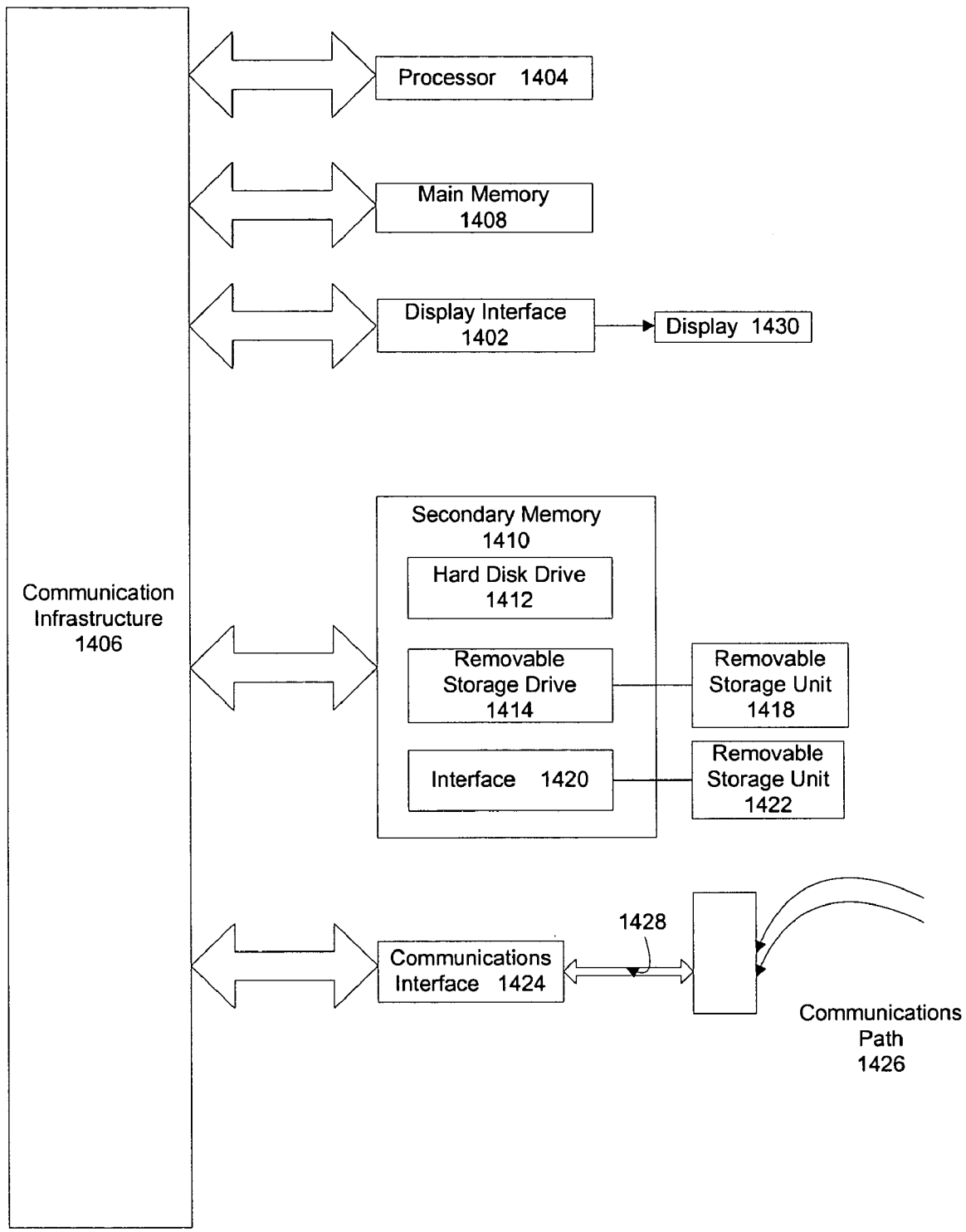
FIG. 14 is a block diagram of a sample computer system that can be used in the implementation of one or more embodiments of the present invention.

In fact, in one embodiment, the invention is directed toward one or more computer systems capable of carrying out the functionality described herein. An example of a computer system 1400 is shown in FIG. 14.

The computer system 1400 includes one or more processors, such as processor 1404. The processor 1404 is connected to a communication infrastructure 1406 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1400 can include a display interface 1402 that forwards graphics, text, and other data from the communication infrastructure 1406 (or from a frame buffer not shown) for display on the display unit 1430.

Computer system 1400 also includes a main memory 1408, random access memory (RAM), and may also include a secondary memory 1410. The secondary memory 1410 may include, for example, a hard disk drive 1412 and/or a removable storage drive 1414, representing a floppy disk drive, a magnetic tape drive, an optical disk drive, etc. The removable storage drive 1414 reads from and/or writes to a removable storage unit 1418 in a well known manner. Removable storage unit 1418 represents a floppy disk, magnetic tape, optical disk, etc. which is read by and written to by removable storage drive 1414. As will be appreciated, the removable storage unit 1418 includes a computer usable storage medium having stored therein computer software and/or data.

In alternative embodiments, secondary memory 1410 may include other similar devices for allowing computer programs or other instructions to be loaded into computer system 1400. Such devices may include, for example, a removable storage unit 1422 and an interface 1420. Examples of such may include a program cartridge and cartridge interface (such as that found in video game devices), a removable memory chip (such as an erasable programmable read only memory (EPROM), or programmable read only memory (PROM)) and associated socket, and other removable storage units 1422 and interfaces 1420, which allow software and data to be transferred from the removable storage unit 1422 to computer system 1400.

Computer system 1400 may also include a communications interface 1424. Communications interface 1424 allows software and data to be transferred between computer system 1400 and external devices. Examples of communications interface 1424 may include a modem, a network interface (such as an Ethernet card), a communications port, a Personal Computer Memory Card International Association (PCM-CIA) slot and card, etc. Software and data transferred via communications interface 1424 are in the form of signals 1428 which may be electronic, electromagnetic, optical or other signals capable of being received by communications interface 1424. These signals 1428 are provided to communications interface 1424 via a communications path (e.g., channel) 1426. This channel 1426 carries signals 1428 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 1414, a hard disk installed in hard disk drive 1412, and signals 1428. These computer program products provide software to computer system 1400. The invention is directed to such computer program products.

Computer programs (also referred to as computer control logic) are stored in main memory 1408 and/or secondary memory 1410. Computer programs may also be received via communications interface 1424. Such computer programs, when executed, enable the computer system 1400 to perform the features of the present invention, as discussed herein. In particular, the computer programs, when executed, enable the processor 1404 to perform the features of the present invention. Accordingly, such computer programs represent controllers of the computer system 1400.

In an embodiment where the invention is implemented using software, the software may be stored in a computer program product and loaded into computer system 1400 using removable storage drive 1414, hard drive 1412 or communications interface 1424. The control logic (software), when executed by the processor 1404, causes the processor 1404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention (e.g., packaging and activation of other transaction cards and/or use of batch activation processes). Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
    associating, by an account issuing system for depositing funds into a deposit account through use of a transaction account, the transaction account with the deposit account, wherein the account issuing system includes a processor and non-transitory memory;
    storing, by the account issuing system, an amount of funds to be deposited from the transaction account into the deposit account based on a cash back amount established for the transaction account;

verifying, by the account issuing system, that criteria for receiving cash back from the transaction account issuer is met;

verifying, by the account issuing system, the transaction account has a predetermined bill payment status; and automatically depositing, by the account issuing system, the cash back amount of funds from the transaction account into the deposit account, in response to both (1) the verifying the criteria is met and (2) the verifying the predetermined bill payment status is met.

2. The method of claim 1, wherein the predetermined bill payment status comprises if a bill of the transaction account has been paid, if a portion of the bill of the transaction account has been paid, or if a threshold amount of the bill of the transaction account has been paid.

3. The method of claim 1, wherein the storing comprises using a percentage of monthly charges as the cash back amount of funds.

4. The method of claim 1 wherein the depositing further comprises:

automatically depositing, by the account issuing system, the cash back amount of funds at an end of each billing period of the transaction account.

5. The method of claim 4 wherein the storing comprises:

calculating a percentage of charges that were charged to the transaction account during the billing period as the cash back amount of funds to be deposited from the transaction account into the deposit account.

6. The method of claim 1, wherein the transaction account and the deposit account are established at one entity.

7. The method of claim 1, wherein the transaction account and the deposit account are established at different entities.

8. The method of claim 1, wherein the transaction account and the deposit account are established at affiliated entities.

9. The method of claim 1, further comprising:

depositing, by the account issuing system, an additional savings amount into said deposit account, wherein said additional savings amount is established by said owner of said transaction account by overpaying an amount billed on a billing statement received for a billing cycle.

10. The method of claim 1, further comprising:

receiving, by the account issuing system from an owner of the transaction account, a second amount of funds to be deposited from the transaction account into the deposit account; and depositing, by the account issuing system, the second amount of funds established by said owner from the transaction account into the deposit account.

11. The method of claim 1, wherein the deposit account comprises a plurality of deposit accounts.

12. The method of claim 1, wherein the cash back amount of funds is available to a owner of the transaction account, prior to receiving a billing statement for the billing cycle.

13. A non-transitory, tangible computer-readable medium having stored thereon, computer-executable instructions that, if executed by a computing device for depositing funds into a deposit account through use of a transaction account, cause the computing device to perform a method, comprising:

associating, by the computing device, the transaction account with the deposit account;

storing, by the computing device, an amount of funds to be deposited from the transaction account into the deposit account based on a cash back amount established for the transaction account;

verifying, by the computing device, criteria for receiving cash back from the transaction account issuer is met;

verifying, by the computing device, the transaction account has a predetermined bill payment status; and automatically depositing, by the computing device, the cash back amount of funds from the transaction account, in response to both (1) the verifying the criteria for receiving cash back is met and (2) the verifying the transaction account has a predetermined bill payment status.

14. A system for depositing funds into a deposit account through use of a transaction account, comprising:

a deposit system including the deposit account; and a computer based billing system, comprising:

a non-transitory memory, a processor and a database;

the database configured to store an amount of funds to be deposited from a transaction account into the deposit account based on a cash back amount established for the transaction account, wherein the computer based billing system is configured to:

associate the transaction account with the deposit account, verify criteria for receiving cash back from the transaction account issuer is met;

verify the transaction account has a predetermined bill payment status; and automatically initiate a deposit of the cash back amount of funds from the transaction account into the deposit account in response to both (1) the verifying the criteria is met and (2) the verifying the predetermined bill payment status is met.

15. A system comprising:

a tangible, non-transitory memory communicating with a processor for depositing funds, the tangible, non-transitory memory having instructions stored thereon that, in response to execution by the processor, cause the processor to perform operations comprising:

associating, by the processor, a transaction account with a deposit account;

storing, by the processor, an amount of funds to be deposited from the transaction account into the deposit account based on a cash back amount established for the transaction account;

verifying, by the processor, criteria for receiving cash back from the transaction account issuer is met;

verifying, by the processor, the transaction account has a predetermined bill payment status; and automatically initiating, by the processor, a deposit of the cash back amount of funds from the transaction account into the deposit account in response to both (1) the verifying the criteria is met and (2) the verifying the predetermined bill payment status is met.

* * * * *